(12) United States Patent
Pleros et al.

(10) Patent No.: US 12,353,988 B2
(45) Date of Patent: Jul. 8, 2025

(54) NEUROMORPHIC PHOTONICS WITH COHERENT LINEAR NEURONS

(71) Applicant: Celestial AI Inc., Sunnyvale, CA (US)

(72) Inventors: Nikolaos Pleros, Salonika (GR); George Mourgias-Alexandris, Salonika (GR); Angelina Totovic, Central Macedonia (GR); Apostolos Tsakyridis, Salonika (GR); Nikolaos Passalis, Salonika (GR); Anastasios Tefas, Salonika (GR); Konstantinos Vyrsokinos, Salonika (GR)

(73) Assignee: Celestial AI Inc., Santa Clara, CA (US)

( * ) Notice: Subject to any disclaimer, the term of this patent is extended or adjusted under 35 U.S.C. 154(b) by 1035 days.

(21) Appl. No.: 17/305,486

(22) Filed: Jul. 8, 2021

(65) Prior Publication Data

US 2022/0012582 A1 Jan. 13, 2022

Related U.S. Application Data

(60) Provisional application No. 63/049,928, filed on Jul. 9, 2020.

(51) Int. Cl.
 *G06N 3/067* (2006.01)
 *H04B 10/516* (2013.01)
 (Continued)

(52) U.S. Cl.
 CPC ......... *G06N 3/0675* (2013.01); *H04B 10/516* (2013.01); *H04B 10/548* (2013.01); *G06N 3/049* (2013.01); *H04B 10/54* (2013.01)

(58) Field of Classification Search
None
See application file for complete search history.

(56) References Cited

U.S. PATENT DOCUMENTS

| | | | |
|---|---|---|---|
| 4,912,706 A | 3/1990 | Eisenberg et al. | |
| 4,934,775 A | 6/1990 | Koai | |

(Continued)

FOREIGN PATENT DOCUMENTS

| | | |
|---|---|---|
| AU | 2019100030 A | 2/2019 |
| AU | 2019100679 A | 8/2019 |

(Continued)

OTHER PUBLICATIONS

U.S. Appl. No. 17/395,849, filed Aug. 6, 2021, Coherent Photonic Computing Architectures.

(Continued)

*Primary Examiner* — Jai M Lee
(74) *Attorney, Agent, or Firm* — Ray Quinney & Nebeker; James Bullough (57) ABSTRACT

Neuromorphic computing can employ coherent linear optical neurons implemented with multipath optical interferometers in which optical amplitude modulators and phase shifters impart neuron input signals and neuron weights onto optical carrier signals that are then summed at the interferometer output. Photodetectors at the interferometer output, optionally in conjunction with preceding nonlinear optical circuits, may implement a non-linear activation function and generate electronic neuron output signals that can be provided as input to other optical neurons to form an optical neural network.

20 Claims, 9 Drawing Sheets

(51) Int. Cl.
  *H04B 10/54* (2013.01)
  *H04B 10/548* (2013.01)
  *G06N 3/049* (2023.01)

(56) References Cited

U.S. PATENT DOCUMENTS

| | | | |
|---|---|---|---|
| 5,457,563 A | 10/1995 | Van Deventer | |
| 5,541,914 A * | 7/1996 | Krishnamoorthy | ... H04L 49/254 370/427 |
| 6,249,621 B1 | 6/2001 | Sargent et al. | |
| 6,714,552 B1 | 3/2004 | Cotter | |
| 7,034,641 B1 | 4/2006 | Clarke et al. | |
| 7,778,501 B2 | 8/2010 | Beausoleil et al. | |
| 7,889,996 B2 | 2/2011 | Zheng et al. | |
| 7,894,699 B2 | 2/2011 | Beausoleil | |
| 7,961,990 B2 | 6/2011 | Krishnamoorthy et al. | |
| 8,064,739 B2 | 11/2011 | Binkert et al. | |
| 8,213,751 B1 | 7/2012 | Ho et al. | |
| 8,260,147 B2 | 9/2012 | Scandurra et al. | |
| 8,285,140 B2 | 10/2012 | McCracken et al. | |
| 8,326,148 B2 | 12/2012 | Bergman et al. | |
| 8,340,517 B2 | 12/2012 | Shacham et al. | |
| 8,447,146 B2 | 5/2013 | Beausoleil et al. | |
| 8,611,747 B1 | 12/2013 | Wach | |
| 9,036,482 B2 | 5/2015 | Lea | |
| 9,354,039 B2 * | 5/2016 | Mower | ... B82Y 20/00 |
| 9,369,784 B2 | 6/2016 | Zid et al. | |
| 9,495,295 B1 | 11/2016 | Dutt et al. | |
| 9,791,761 B1 | 9/2017 | Li et al. | |
| 9,831,360 B2 | 11/2017 | Knights et al. | |
| 9,882,655 B2 | 1/2018 | Li et al. | |
| 10,031,287 B1 | 7/2018 | Heroux et al. | |
| 10,107,959 B2 | 10/2018 | Heroux et al. | |
| 10,117,007 B2 | 10/2018 | Song et al. | |
| 10,185,085 B2 | 1/2019 | Huangfu et al. | |
| 10,225,632 B1 | 3/2019 | Dupuis et al. | |
| 10,250,958 B2 | 4/2019 | Chen et al. | |
| 10,268,232 B2 * | 4/2019 | Harris | ... G06E 3/008 |
| 10,281,747 B2 | 5/2019 | Padmaraju et al. | |
| 10,365,445 B2 | 7/2019 | Badihi et al. | |
| 10,564,512 B2 | 2/2020 | Sun et al. | |
| 10,598,852 B1 | 3/2020 | Zhao et al. | |
| 10,651,933 B1 | 5/2020 | Chiang et al. | |
| 10,837,827 B2 | 11/2020 | Nahmias et al. | |
| 10,908,369 B1 | 2/2021 | Mahdi et al. | |
| 10,915,297 B1 | 2/2021 | Halutz et al. | |
| 10,935,722 B1 | 3/2021 | Li et al. | |
| 10,951,325 B1 | 3/2021 | Rathinasamy et al. | |
| 10,962,728 B2 | 3/2021 | Nelson et al. | |
| 10,976,491 B2 | 4/2021 | Coolbaugh et al. | |
| 11,107,770 B1 | 8/2021 | Ramalingam et al. | |
| 11,157,807 B2 * | 10/2021 | Abel | ... G02F 1/3501 |
| 11,165,509 B1 | 11/2021 | Nagarajan et al. | |
| 11,165,711 B2 | 11/2021 | Mehrvar et al. | |
| 11,233,580 B2 | 1/2022 | Meade et al. | |
| 11,321,092 B1 | 5/2022 | Raikin et al. | |
| 11,336,376 B1 | 5/2022 | Xie | |
| 11,475,367 B2 * | 10/2022 | Lazovich | ... G06N 3/084 |
| 11,493,714 B1 | 11/2022 | Mendoza et al. | |
| 11,500,153 B2 | 11/2022 | Meade et al. | |
| 11,769,710 B2 | 9/2023 | Refai-Ahmed et al. | |
| 12,061,978 B2 * | 8/2024 | Zalevsky | ... G02F 1/353 |
| 2004/0213229 A1 | 10/2004 | Chang et al. | |
| 2006/0159387 A1 | 7/2006 | Handelman | |
| 2006/0204247 A1 | 9/2006 | Murphy | |
| 2011/0206379 A1 | 8/2011 | Budd | |
| 2012/0020663 A1 | 1/2012 | McLaren | |
| 2012/0251116 A1 | 10/2012 | Li et al. | |
| 2013/0275703 A1 | 10/2013 | Schenfeld | |
| 2013/0308942 A1 | 11/2013 | Ji et al. | |
| 2015/0109024 A1 | 4/2015 | Abdelfattah et al. | |
| 2015/0354938 A1 | 12/2015 | Mower et al. | |
| 2016/0116688 A1 | 4/2016 | Hochberg et al. | |
| 2016/0131862 A1 | 5/2016 | Rickman et al. | |
| 2016/0344507 A1 | 11/2016 | Marquardt et al. | |
| 2017/0045697 A1 | 2/2017 | Hochberg et al. | |
| 2017/0194309 A1 | 7/2017 | Evans et al. | |
| 2017/0194310 A1 | 7/2017 | Evans et al. | |
| 2017/0207600 A1 | 7/2017 | Klamkin et al. | |
| 2017/0220352 A1 | 8/2017 | Woo et al. | |
| 2017/0261708 A1 | 9/2017 | Ding et al. | |
| 2017/0285372 A1 | 10/2017 | Baba et al. | |
| 2018/0107030 A1 | 4/2018 | Morton et al. | |
| 2018/0260703 A1 * | 9/2018 | Soljacic | ... G06N 3/084 |
| 2019/0026225 A1 | 1/2019 | Gu et al. | |
| 2019/0049665 A1 | 2/2019 | Ma et al. | |
| 2019/0205737 A1 * | 7/2019 | Bleiweiss | ... G06N 3/063 |
| 2019/0265408 A1 | 8/2019 | Ji et al. | |
| 2019/0266088 A1 | 8/2019 | Kumar | |
| 2019/0266089 A1 | 8/2019 | Kumar | |
| 2019/0294199 A1 * | 9/2019 | Carolan | ... G06N 3/08 |
| 2019/0317285 A1 | 10/2019 | Liff | |
| 2019/0317287 A1 | 10/2019 | Raghunathan et al. | |
| 2019/0356394 A1 | 11/2019 | Bunandar et al. | |
| 2019/0372589 A1 | 12/2019 | Gould | |
| 2019/0385997 A1 | 12/2019 | Choi et al. | |
| 2020/0006304 A1 | 1/2020 | Chang et al. | |
| 2020/0125716 A1 | 4/2020 | Chittamuru et al. | |
| 2020/0142441 A1 | 5/2020 | Bunandar et al. | |
| 2020/0158967 A1 | 5/2020 | Winzer et al. | |
| 2020/0174707 A1 | 6/2020 | Johnson et al. | |
| 2020/0200987 A1 | 6/2020 | Kim | |
| 2020/0213028 A1 | 7/2020 | Behringer et al. | |
| 2020/0250532 A1 * | 8/2020 | Shen | ... G06E 3/008 |
| 2020/0284981 A1 | 9/2020 | Harris et al. | |
| 2020/0310761 A1 | 10/2020 | Rossi et al. | |
| 2020/0327403 A1 * | 10/2020 | Du | ... G06N 3/04 |
| 2020/0409001 A1 | 12/2020 | Liang et al. | |
| 2020/0410330 A1 | 12/2020 | Liu et al. | |
| 2021/0036783 A1 * | 2/2021 | Bunandar | ... H03K 19/21 |
| 2021/0064958 A1 | 3/2021 | Lin et al. | |
| 2021/0072784 A1 | 3/2021 | Lin et al. | |
| 2021/0116637 A1 | 4/2021 | Li et al. | |
| 2021/0132309 A1 | 5/2021 | Zhang et al. | |
| 2021/0132650 A1 | 5/2021 | Wenhua et al. | |
| 2021/0133547 A1 | 5/2021 | Wenhua et al. | |
| 2021/0173238 A1 | 6/2021 | Hosseinzadeh | |
| 2021/0257396 A1 | 8/2021 | Piggott et al. | |
| 2021/0271020 A1 | 9/2021 | Islam et al. | |
| 2021/0286129 A1 | 9/2021 | Fini et al. | |
| 2021/0305127 A1 | 9/2021 | Refai-Ahmed et al. | |
| 2021/0406164 A1 | 12/2021 | Grymel et al. | |
| 2021/0409848 A1 | 12/2021 | Saunders et al. | |
| 2022/0003948 A1 | 1/2022 | Zhou et al. | |
| 2022/0004029 A1 | 1/2022 | Meng | |
| 2022/0012578 A1 | 1/2022 | Brady et al. | |
| 2022/0044092 A1 | 2/2022 | Pleros et al. | |
| 2022/0045757 A1 | 2/2022 | Pleros et al. | |
| 2022/0091332 A1 | 3/2022 | Yoo et al. | |
| 2022/0092016 A1 | 3/2022 | Kumashikar | |
| 2022/0159860 A1 | 5/2022 | Winzer et al. | |
| 2022/0171142 A1 * | 6/2022 | Wright | ... G02B 6/4219 |
| 2022/0263582 A1 | 8/2022 | Ma et al. | |
| 2022/0302033 A1 | 9/2022 | Cheah et al. | |
| 2022/0342164 A1 | 10/2022 | Chen et al. | |
| 2022/0374575 A1 | 11/2022 | Ramey et al. | |
| 2022/0382005 A1 | 12/2022 | Rusu | |
| 2023/0089415 A1 | 3/2023 | Zilkie et al. | |
| 2023/0197699 A1 | 6/2023 | Spreitzer et al. | |
| 2023/0251423 A1 | 8/2023 | Perez Lopez et al. | |
| 2023/0258886 A1 | 8/2023 | Liao | |
| 2023/0282547 A1 | 9/2023 | Refai-Ahmed et al. | |
| 2023/0308188 A1 | 9/2023 | Dorta-Quinones | |
| 2023/0314702 A1 | 10/2023 | Yu | |
| 2023/0376818 A1 | 11/2023 | Nowak | |
| 2023/0393357 A1 | 12/2023 | Ranno | |

FOREIGN PATENT DOCUMENTS

| | | |
|---|---|---|
| AU | 2019100750 A | 8/2019 |
| CN | 102281478 A | 12/2011 |
| CN | 102333250 A | 1/2012 |
| CN | 102413039 A | 4/2012 |
| CN | 102638311 A | 8/2012 |

(56) References Cited

FOREIGN PATENT DOCUMENTS

| | | | |
|---|---|---|---|
| CN | 102645706 | A | 8/2012 |
| CN | 202522621 | U | 11/2012 |
| CN | 103369415 | A | 10/2013 |
| CN | 103442311 | A | 12/2013 |
| CN | 103580890 | A | 2/2014 |
| CN | 104539547 | A | 4/2015 |
| CN | 105451103 | A | 3/2016 |
| CN | 205354341 | U | 6/2016 |
| CN | 105812063 | A | 7/2016 |
| CN | 105847166 | A | 8/2016 |
| CN | 106126471 | A | 11/2016 |
| CN | 106331909 | A | 1/2017 |
| CN | 106407154 | A | 2/2017 |
| CN | 106533993 | A | 3/2017 |
| CN | 106549874 | A | 3/2017 |
| CN | 106796324 | | 5/2017 |
| CN | 106888050 | A | 6/2017 |
| CN | 106911521 | A | 6/2017 |
| CN | 106936708 | A | 7/2017 |
| CN | 106936736 | A | 7/2017 |
| CN | 106980160 | A | 7/2017 |
| CN | 107911761 | A | 4/2018 |
| CN | 108599850 | A | 9/2018 |
| CN | 207835452 | U | 9/2018 |
| CN | 108737011 | A | 11/2018 |
| CN | 110266585 | A | 9/2019 |
| CN | 110505021 | A | 11/2019 |
| CN | 111208690 | A | 5/2020 |
| CN | 111752891 | A | 10/2020 |
| CN | 111770019 | A | 10/2020 |
| CN | 111786911 | A | 10/2020 |
| FR | 3007537 | A | 12/2014 |
| GB | 2223867 | | 4/1990 |
| IN | 201621017235 | A | 7/2016 |
| IN | 202121008267 | A | 4/2021 |
| JP | 6747660 | B | 8/2020 |
| JP | 2020155112 | | 9/2020 |
| KR | 101242172 | B | 3/2013 |
| KR | 101382606 | B | 4/2014 |
| KR | 101465420 | B | 11/2014 |
| KR | 101465498 | B | 11/2014 |
| KR | 101541534 | B | 8/2015 |
| KR | 101548695 | B | 9/2015 |
| KR | 101766786 | B | 8/2017 |
| KR | 101766792 | B | 8/2017 |
| WO | WO2015176289 | | 11/2015 |
| WO | WO2020072925 | | 4/2020 |
| WO | WO2020102204 | | 5/2020 |
| WO | WO-2020191217 | A1 | 9/2020 |
| WO | WO-2021021787 | A1 | 2/2021 |
| WO | WO-2022032105 | A1 | 2/2022 |
| WO | WO2022133490 | | 6/2022 |
| WO | WO2023177417 | | 9/2022 |
| WO | WO2022266676 | | 12/2022 |
| WO | WO2023177922 | | 9/2023 |

OTHER PUBLICATIONS

U.S. Appl. No. 17/395,903, filed Aug. 6, 2021, Coherent Photonic Computing Architectures.
U.S. Appl. No. 17/645,001, filed Dec. 17, 2021, Balanced Photonic Architectures for Matrix Computations.
U.S. Appl. No. 18/123,161, filed Mar. 17, 2023, Bos et al.
U.S. Appl. No. 18/123,170, filed Mar. 17, 2023, Sahni.
U.S. Appl. No. 63/428,663, filed Nov. 29, 2022, Sahni et al.
U.S. Appl. No. 63/441,689, filed Jan. 27, 2023, Winterbottom.
U.S. Appl. No. 63/579,486, filed Aug. 29, 2023, Aggarwal et al.
U.S. Appl. No. 63/535,509, filed Aug. 30, 2023, Winterbottom et al.
U.S. Appl. No. 63/535,511, filed Aug. 30, 2023, Winterbottom et al.
U.S. Appl. No. 63/535,512, filed Aug. 30, 2023, José Maia da Silva et al.
U.S. Appl. No. 63/592,509, filed Oct. 23, 2023, Aggarwal et al.
U.S. Appl. No. 63/592,517, filed Oct. 23, 2023, Winterbottom et al.
U.S. Appl. No. 18/473,898, filed Sep. 25, 2023, Pleros et al.
U.S. Appl. No. 18/523,667, filed Nov. 29, 2023, Sahni et al.
Raj, Mayank et al.; "Design of a 50-GB/s Hybid Integrated Si-Photonic Optical Link in 16-nm FinFET"; IEEE Journal of Solid-State Circuits, vol. 55, No. 4, Apr. 2020, pp. 1086-1095.
U.S. Appl. No. 17/395,849, Jan. 5, 2023, Office Action.
U.S. Appl. No. 17/395,849, Jul. 24, 2023, Notice of Allowance.
U.S. Appl. No. 17/645,001, Jul. 20, 2022, Notice of Allowance.
PCT/US2022/042621, Feb. 15, 2023, International Search Report and Written Opinion.
PCT/US2023/015680, May 23, 2023, Invitation to Pay Additional Fees.
PCT/US2023/015680, Aug. 23, 2023, International Search Report and Written Opinion.
U.S. Appl. No. 18/293,673, filed Jan. 30, 2024, Bos et al.
U.S. Appl. No. 18/407,408, filed Jan. 8, 2024, Aggarwal.
U.S. Appl. No. 18/407,410, filed Jan. 8, 2024, Aggarwal.
U.S. Appl. No. 18/423,210, filed Jan. 25, 2024, Winterbottom.
U.S. Appl. No. 18/540,579, filed Dec. 14, 2023, Winterbottom et al.
U.S. Appl. No. 18/590,689, filed Feb. 28, 2024, Winterbottom et al.
U.S. Appl. No. 18/590,703, filed Feb. 28, 2024, Winterbottom et al.
U.S. Appl. No. 18/590,708, filed Feb. 28, 2024, Winterbottom et al.
U.S. Appl. No. 18/540,579, Feb. 14, 2024, Office Action.
U.S. Appl. No. 17/807,692, Feb. 15, 2024, Restriction Requirement.
U.S. Appl. No. 18/407,408, Mar. 28, 2024, Office Action.
U.S. Appl. No. 18/407,410, Mar. 15, 2024, Restriction Requirement.
20220404544, Jan. 19, 2024, Foreign Office Action.
202180068303.5, Jan. 20, 2024, Foreign Office Action.
PCT/US2022/042621, Feb. 26, 2024, International Preliminary Report on Patentability.
2023-564535, Apr. 9, 2024, Foreign Office Action.
U.S. Appl. No. 18/407,408, Oct. 2, 2024, Notice of Allowance.
2023-537068, Oct. 1, 2024, Foreign Office Action.
11202304676X, Oct. 4, 2024, Foreign Notice of Allowance.
U.S. Appl. No. 18/590,689, Nov. 7, 2024, Office Action.
U.S. Appl. No. 18/407,410, Oct. 22, 2024, Notice of Allowance.
U.S. Appl. No. 63/392,475, filed Jul. 26, 2022, Aggarwal et al.
U.S. Appl. No. 18/076,196, filed Dec. 6, 2022, Aggarwal et al.
U.S. Appl. No. 18/076,210, filed Dec. 6, 2022, Aggarwal et al.
U.S. Appl. No. 18/217,898, filed Jul. 3, 2023, Aggarwal et al.
U.S. Appl. No. 63/437,639, filed Jan. 6, 2023, Plunkett et al.
U.S. Appl. No. 63/437,641, filed Jan. 6, 2023, Plunkett et al.
Hendry, G et al.; "Circuit-Switched Memory Access in Photonic Interconnection Networks for High-Performance Embedded Computing," SC '10: Proceedings of the 2010 ACM/IEEE International Conference for High Performance Computing, Networking, Storage and Analysis, New Orleans, LA, USA, 2010, pp. 1-12.
Liu, Jifeng, et al; "Waveguide-integrated, ultralow-energy GeSi electro-absorption modulators", Nature Photonics, [Online] vol. 2, No. 7, May 30, 2008 (May 30, 2008), pp. 433-437.
Wu, Longsheng et al.; "Design of a broadband Ge 1-20 1-x Six electro-absorption modulator based on the Franz-Keldysh effect with thermal tuning", Optics Express, [Online] vol. 28, No. 5, Feb. 27, 2020 (Feb. 27, 2020), p. 7585.
Zhang, Yulong; "Building blocks of a silicon photonic integrated wavelength division multiplexing transmitter for detector instrumentation", Doktors Der Ingenieurwissenschaften (Dr.-Ing. ), Dec. 15, 2020 (Dec. 15, 2020), 128 pages.
U.S. Appl. No. 18/540,579, May 1, 2024, Office Action.
U.S. Appl. No. 17/807,692, Jul. 12, 2024, Office Action.
U.S. Appl. No. 18/407,408, Jul. 30, 2024, Notice of Allowance.
U.S. Appl. No. 18/407,410, May 24, 2024, Office Action.
U.S. Appl. No. 18/407,410, Aug. 12, 2024, Notice of Allowance.
U.S. Appl. No. 17/903,455, Jun. 27, 2024, Office Action.
U.S. Appl. No. 18/590,708, Aug. 7, 2024, Notice of Allowance.
PCT/US2023/015680, Aug. 9, 2024, International Preliminary Report on Patentability.
10-2023-7007856, Aug. 21, 2024, Foreign Notice of Allowance.
202180068303.5, Jul. 31, 2024, Foreign Notice of Allowance.
11202307570T, Apr. 10, 2024, Foreign Notice of Allowance.
202280020819.7, Apr. 4, 2024, Foreign Office Action.
202180093875.9, Apr. 12, 2024, Foreign Office Action.

(56) References Cited

OTHER PUBLICATIONS

PCT/US2024/010774, May 3, 2024, International Search Report and Written Opinion.
EP23220883, May 7, 2024, Extended European Search Report.
PCT/US2024/013168, May 8, 2024, International Search Report and Written Opinion.
22826043.6, Jun. 14, 2024, Extended European Search Report.
21853044.2, Jul. 23, 2024, Extended European Search Report.
1020237024129, Aug. 2, 2024, Foreign Office Action.
1020237044346, Aug. 27, 2024, Foreign Office Action.
U.S. Appl. No. 63/049,928, filed Jul. 9, 2020, Pleros et al.
U.S. Appl. No. 63/062,163, filed Aug. 6, 2020, Pleros et al.
U.S. Appl. No. 63/199,286, filed Dec. 17, 2020, Ma et al.
U.S. Appl. No. 63/199,412, filed Dec. 23, 2022, Ma et al.
U.S. Appl. No. 63/201,155, filed Apr. 15, 2021, Ma et al.
U.S. Appl. No. 63/261,974, filed Oct. 1, 2021, Pleros et al.
U.S. Appl. No. 63/212,353, filed Jun. 18, 2021, Winterbottom et al.
U.S. Appl. No. 17/807,692, filed Jun. 17, 2022, Winterbottom et al.
PCT/US2022/073039, Jun. 17, 2022, Winterbottom et al.
U.S. Appl. No. 17/807,694, filed Jun. 17, 2022, Winterbottom et al.
U.S. Appl. No. 17/807,698, filed Jun. 17, 2022, Winterbottom et al.
U.S. Appl. No. 17/807,699, filed Jun. 17, 2022, Winterbottom et al.
U.S. Appl. No. 17/807,695, filed Jun. 17, 2022, Winterbottom et al.
U.S. Appl. No. 63/321,453, filed Mar. 18, 2022, Bos et al.
U.S. Appl. No. 17/903,455, filed Sep. 6, 2022, Lazovsky et al.
PCT/US2022/042621, Sep. 6, 2022, Lazovsky et al.
U.S. Appl. No. 17/957,731, filed Sep. 30, 2022, Pleros et al.
U.S. Appl. No. 17/957,812, filed Sep. 30, 2022, Pleros et al.
U.S. Appl. No. 63/420,323, filed Oct. 28, 2022, Sahni.
U.S. Appl. No. 63/420,330, filed Oct. 28, 2022, Sahni et al.
Ardestani, et al., "Supporting Massive DLRM Inference Through Software Defined Memory", Nov. 8, 2021; 14 pages.
PCT/US2022/073039, Sep. 1, 2022, Invitation to Pay Additional Fees.
"International Application Serial No. PCT/US2021/044956, International Search Report mailed Nov. 19, 2021", 4 pgs.
"International Application Serial No. PCT/US2021/044956, Written Opinion mailed Nov. 19, 2021", 7 pgs.
"International Application Serial No. PCT/US2021/073003, International Search Report mailed Mar. 22, 2022", 5 pgs.
"International Application Serial No. PCT/US2021/073003, Written Opinion mailed Mar. 22, 2022", 8 pgs.
Agrawal, Govind, "Chapter 4—Optical Receivers", Fiber-Optic Communications Systems, John Wiley & Sons, Inc., (2002), 133-182.
Burgwal, Roel, et al., "Using an imperfect photonic network to implement random unitaries,", Opt. Express 25(23), (2017), 28236-28245.
Capmany, Francoy, et al., "The programmable processor.", Nature Phontonics 10:6, (2016), 5 pgs.
Carolan, Jacques, et al., "Universal Linear Optics", arXiv:1505.01182v1, (2015), 13 pgs.
Clements, William, et al., "Optimal design for universal multiport interferometers", Optica, vol. 3, No. 12, (2016), 1460-1465.
Eltes, Felix, et al., "A BaTiO3-Based Electro-Optic Pockels Modulator Monolithically Integrated on an Advanced Silicon Photonics Platform", J. Lightwave Technol. vol. 37, No. 5, (2019), 1456-1462.
Eltes, Felix, et al., "Low-Loss BaTiO3—Si Waveguides for Nonlinear Integrated Photonics", ACS Photon., vol. 3, No. 9, (2016), 1698-170.
Harris, N C, et al., "Efficient, compact and low loss thermo-optic phase shifter in silicon", Opt. Express, vol. 22, No. 9, (2014), 7 pgs.
Jiang, W, "Nonvolatile and ultra-low-loss reconfigurable mode (De)multiplexer/switch using triple-waveguide coupler with Ge2Sb2Se4Te1 phase change material,", Sci. Rep., vol. 8, No. 1, (2018), 12 pgs.
Lambrecht, Joris, et al., "90-GB/s NRZ Optical Receiver in Silicon Using a Fully Differential Transimpedance Amplifier,", Journal of Lightwave Technology, vol. 37, No. 9, (2019), 1964-1973.
Manolis, A, et al., "Non-volatile integrated photonic memory using GST phase change material on a fully etched Si3N4/SiO2 waveguide", Conference on Lasers and Electro-Optics, OSA Technical Digest, paper STh3R.4, (2020), 2 pgs.
Miller, David A, "Perfect optics with imperfect components", Optica, vol. 2, No. 8, (2015), 747-750.
Miller, David A, et al., "Self-Configuring Universal Linear Optical Component", Photon. Res. 1, [Online]. Retrieved from the Internet: <URL: https://arxiv.org/ftp/arxiv/papers/1303/1303.4602.pdf>, (2013), 1-15.
Miscuglio, Mario, et al., "Photonic Tensor cores for machine learning", Applied Physics Reviews vol. 7, Issue 3. arXiv:2002.03780, (2020), 16 pgs.
Mourgias-Alexandris, G, et al., "An all-optical neuron with sigmoid activation function", Optics Express, vol. 27, No. 7, (Apr. 2019), 11 pgs.
Mourgias-Alexandris, George, et al., "Neuromorphic Photonics with Coherent Linear Neurons Using Dual-IQ Modulation Cells", Journal of Lightwave Technology. vol. 38, No. 4, (Feb. 15, 2020), 811-819.
Pai, Sunil, et al., "Parallel Programming of an Arbitrary Feedforward Photonic Network,", IEEE Journal of Selected Topics in Quantum Electronics, vol. 26, No. 5, (2020), 13 pgs.
Perez, Daniel, et al., "Reconfigurable lattice mesh designs for programmable photonic processors", Optics Express vol. 24, Issue 11, (2016), 14 pgs.
Reck, M, et al., "Experimental Realization of any Discrete Unitary Operator", Phys. Rev. Lett. 73, (1994), 58-61.
Shen, Yichen, et al., "Deep learning with coherent nanophotonic circuits", https://arxiv.org/pdf/1610.02365.pdf, (2016), 8 pgs.
Shi, Bin, et al., "Numerical Simulation of an InP Photonic Integrated Cross-Connect for Deep Neural Networks on Chip", Applied Sciences, (Jan. 9, 2020), 1-15.
Shokraneh, Farhad, et al., "The diamond mesh, a phase-error- and loss-tolerant field-programmable MZI-based optical processor for optical neural networks", Opt. Express, 28(16), (2020), 23495-23508.
Sun, Chen, et al., "A 45 nm cmos-soi monolithic photonics platform with bit-statistics-based resonant microring thermal tuning,", EEE Journal of Solid-State Circuits, vol. 51, No. 4, (2016), 20 pgs.
Tait, Alexander, et al., "Broadcast and Weight: An Integrated Network for Scalable Photonic Spike Processing,", Journal of Lightwave Technology, vol. 32, No. 21, (2014), 4029-4041.
Yang, Lin, et al., "On-chip CMOS-compatible optical signal processor", Opt. Express 20(12), (2012), 13560-13565.
Zhuang, L, et al., "Programmable photonic signal processor chip for radiofrequency applications", Optica 2, 854-859, (2015), 10 pgs.
U.S. Appl. No. 18/590,708, Nov. 20, 2024, Notice of Allowance.
U.S. Appl. No. 17/903,455, Nov. 29, 2024, Notice of Allowance.
U.S. Appl. No. 18/123,161, Dec. 16, 2024, Restriction Requirement.
U.S. Appl. No. 18/293,673, Dec. 16, 2024, Restricition Requirement.
U.S. Appl. No. 18/407,408, Dec. 18, 2024, Notice of Allowance.
2023-508467, Nov. 12, 2024, Foreign Office Action.
11202300860T, Nov. 20, 2024, Foreign Office Action.
2023564535, Nov. 27, 2024, Foreign Notice of Allowance.
2021800938759, Dec. 11, 2024, Foreign Office Action.
202280020819.7, Sep. 16, 2024, Foreign Notice of Allowance.
Dakkak, A.D. et al "Accelerating Reduction and Scan Using Tensor Core Units, 2019,ACM,pp. 46-57."
U.S. Appl. No. 18/590,708, Oct. 1, 2024, Office Action.
U.S. Appl. No. 17/807,699, Oct. 1, 2024, Office Action.
U.S. Appl. No. 18/423,210, Sep. 30, 2024, Notice of Allowance.
U.S. Appl. No. 18/540,579, Oct. 8, 2024, Office Action.
PCT/US2022/073039, Dec. 2, 2022, International Search Report and Written Opinion.

* cited by examiner

NEUROMORPHIC PHOTONICS WITH COHERENT LINEAR NEURONS

CROSS-REFERENCE TO RELATED APPLICATION

This application claims priority to and the benefit of U.S. Provisional Patent Application No. 63/049,928, filed on Jul. 9, 2020, which is incorporated herein by reference in its entirety.

TECHNICAL FIELD

This disclosure relates to neuromorphic photonics, such as optical circuitry and architectures for neuromorphic computing.

BACKGROUND

Neuromorphic computing—a brain-inspired computing paradigm in which large-scale integrated analog or digital circuitry mimics neurobiological function—has emerged as a promising candidate for sustaining computational advances as the growth in the computing power of conventional von Neumann architectures, previously characterized by Moore's and Koomey's laws, has slowed down. While research into electronic neuromorphic architectures is ongoing, efforts to transfer neuromorphic computing principles over to optical implementations are already underway, inspired by the speed and energy benefits that photonics has brought to the field of telecommunications and data communications. This transfer presents the challenge of deploying neuromorphic functions as optically enabled building blocks while ensuring that these building blocks yield a photonic circuit infrastructure compatible with the well-established neural network training framework. It is desirable, for example, that the linear neuron stage of an artificial neuron, which is responsible for carrying out weighted addition of multiple inputs, supports both positive and negative weight representations, and that the non-linear activation stage of the artificial neuron conforms to widely used mathematical functions like ReLU, sigmoid, tan h, etc.

Many of the optical weighting layouts that have been proposed so far employ wavelength-division multiplexing (WDM) schemes to encode every input signal onto a different wavelength, and a pair of balanced photodetectors to perform the summation over positive and negative weights. Besides requiring a high number of wavelengths as the number of inputs to a neuron (the neuron "fan-in") increases, these schemes rely on optoelectronic conversion and linear algebraic summation in the electrical domain, followed by, e.g., an electrooptic modulator implementing the nonlinear activation stage, which impedes the employment of all-optical non-linear activation functions and calls for new training frameworks to accommodate non-typical activation functions (such as, e.g., the sinusoidal response of the modulator). An alternative linear photonic neuron scheme that is potentially compatible with non-sinusoidal, all-optical activation functions achieves positive and negative weights for a given input by imprinting complementary data onto two different wavelengths. While this approach eliminates, at least in principle, the need for optical-to-electrical-to-optical conversion, it comes at the cost of using two lasers at different wavelengths for each input. In yet another approach, coherent layouts that exploit the phase of the optical carrier electric field for sign-encoding purposes can yield single-wavelength and single-laser linear neuron deployments. However, coherent neurons have been demonstrated so far only in a rather complex spatial layout for matrix multiplication purposes with multiple cascaded Mach-Zehnder interferometers (MZIs). Alternative optical neuromorphic architectures that allow for positive/negative weight representations and all-optical non-sinusoidal activation functions at reduced complexity are desirable.

BRIEF DESCRIPTION OF THE DRAWINGS

Various example embodiments of the inventive subject matter are described with respect to the accompanying drawings, in which.

DETAILED DESCRIPTION

Described herein are optical neurons with a single-wavelength, coherent linear neuron stage, as well as associated optical neural-network architectures and neuromorphic computing methods. Optical neural networks, herein understood to encompass both all-optical and hybrid optical-electronic neural networks, are physical implementations of artificial neural networks that use optical and/or electrooptic components to impart neuron input signals onto light and manipulate the light to generate neuron output signals. In a coherent linear neuron stage in accordance with this disclosure, the signals are encoded, more specifically, in the electrical field amplitude and phase (as opposed to the intensity) of the light, and multiple optical signals are summed coherently (meaning that their relative phases are taken into account) to generate the linear-neuron output. Beneficially, this approach obviates the need for different wavelengths to carry different signals, and keeps the weighted summation of signals in the optical domain, allowing the positive/negative signs of the weights to be encoded in the optical phase. Further, the linear-neuron output can be processed all-optically as well as electrooptically to implement a non-linear activation function. The coherent linear neuron stage is implemented, in various embodiments, by a multipath interferometer that scales linearly with the number of neuron inputs, with electronically controlled phase shifters and amplitude modulators in the interferometer arms imparting the neuron input signals and weights. Multiple neurons can be connected into a neural network by providing the neuron outputs of one layer, upon conversion into the electrical domain, as neuron inputs to the next layer of the network.

Figure 1:
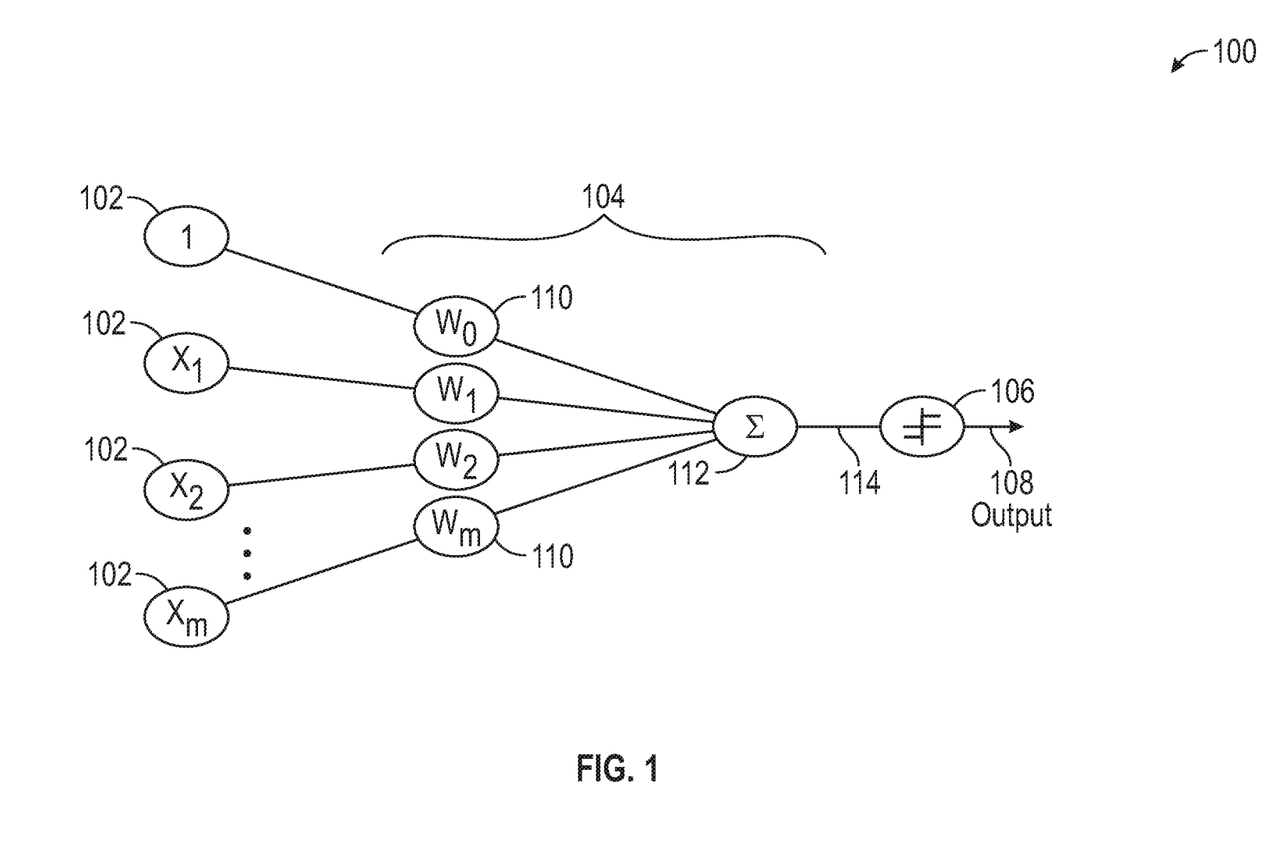
FIG. 1 is a diagram conceptually illustrating an example artificial neuron.

FIG. 1 is a diagram that conceptually illustrates an example artificial neuron 100, corresponding to an individual node of an artificial neural network. The artificial neuron 100 generally takes multiple inputs $x_i$ 102, and processes them in typically two stages—a linear neuron stage 104 followed by a non-linear activation stage 106—to generate a (single) neuron output 108. The linear neuron stage 104 functions like a linear algebraic unit, multiplying each input $x_i$ by a respective neuron weight $w_i$ 110, and summing, at 112, over the weighted inputs to produce the linear-neuron output 114. The weights 110 may be positive or negative, effectively allowing for both addition and subtraction of the inputs 102 via the signs of the weights 110. In the non-linear activation stage 106, a non-linear function is applied to the linear-neuron output 114 to produce the overall neuron output 108. Examples of such non-linear activation functions include, without limitation, logistic functions (sigmoid), trigonometric functions (sinusoid, hyperbolic tangent, etc.), rectified linear units (ReLU), inverse square root linear units (ISRU), exponential linear units (ELU), etc.

Figure 2:
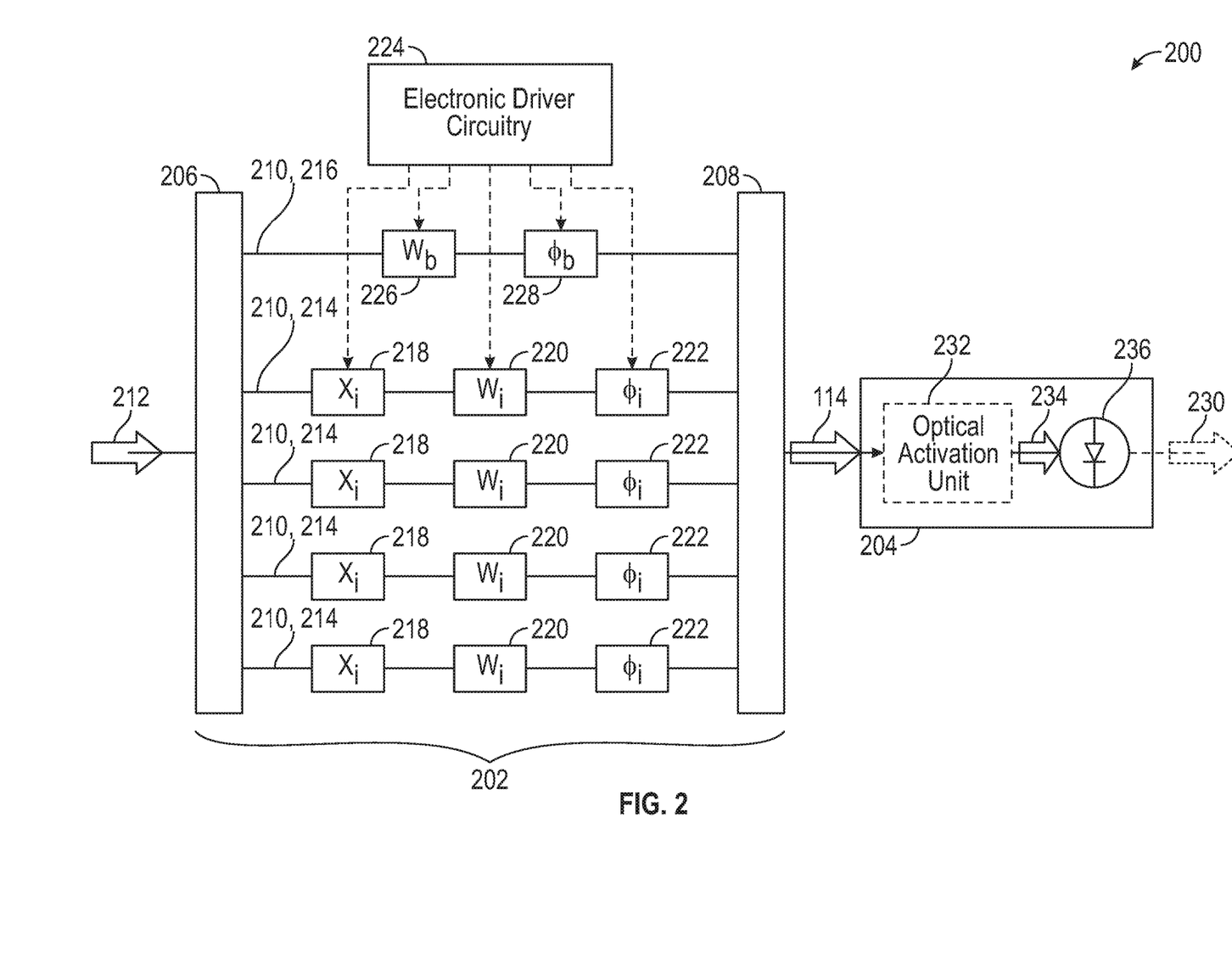
FIG. 2 is a schematic diagram of an optical neuron, including a coherent linear neuron stage and a non-linear activation and conversion unit, in accordance with various embodiments.

FIG. 2 is a schematic diagram of an optical neuron (as may implement an artificial neuron 100), including a coherent linear neuron stage 202 and a non-linear activation and conversion unit 204, in accordance with various embodiments.

The coherent linear neuron stage 202 (herein also for simplicity referred to as a "coherent linear neuron") is implemented by a multipath interferometer formed by an optical splitter 206, an optical combiner 208, and a plurality of parallel optical interferometer branches 210 between the optical splitter 206 and the optical combiner 208. In operation, the splitter 206 splits incoming carrier light 212 between the parallel interferometer branches 210 into a plurality of optical carrier signals, which are then phase- and amplitude-modulated in the respective interferometer branches 210. At the output of the interferometer branches 210, the optical combiner 208 causes interference of the modulated optical carrier signals, resulting in a single optical interference signal, corresponding to the coherent sum of the electrical fields of the modulated optical carrier signals, that constitutes the linear-neuron output 114. The interferometer branches 210 include one "input branch" 214 for each neuron input $x_i$ 102, and optionally a "bias branch" 216 to facilitate encoding the coherent sum over the input branches 214 in the intensity of the optical interference signal, as explained further below. In various embodiments, the optical splitter 206 is configured to send half of the incoming light into the bias branch 216, and split the other half of the light evenly between the input branches 214. However, other split ratios between the bias branch 216 and the entirety of the input branches 214 are also possible.

Each of the input branches 214 includes two amplitude modulators 218, 220 and at least one phase shifter 222 (arranged in any order along the respective branch 214). In operation, electronic driver circuitry 224 associated with the amplitude modulators 218, 220 and phase shifters 222 controls the first optical amplitude modulator 218 in each input branch 214 to impart the absolute value of the respective neuron input $x_i$ 102 onto the optical carrier signal, and controls the second optical amplitude modulator 220 to impart the absolute value of the respective neuron weight $w_i$ 110 onto the optical carrier signal. The phase shifter 222 is controlled to encode the product of the signs of the input $x_i$ 102 and weight $w_i$ 110 by causing, e.g., a phase shift $\varphi_i=\pi$ for a negative overall sign (product of the signs) and a $\varphi_i=0$ for a positive overall sign (the phase shifts $\varphi_i$ being relative to some reference phase common to all of the input branches 214). More specifically, the electrical drive signal of the phase shifter 222 may be the voltage resulting from the addition of the neuron input sign and the weight sign voltages: the voltages encoding the sign of the neuron input may be, for example, 0 V (positive) or 1 V (negative), and the voltages encoding the sign of the weight may be 0 V (positive) or −1V (negative); adding the two voltages together will give 0 V when the neuron input and weight are either both positive or both negative, and −1 or 1 V when then neuron input and weight have different signs. Applying −1 or 1 V to the phase shifter 222 will give in both cases a π phase shift. Alternatively to using a single phase shifter 222 to impart the product of the signs of neuron input and neuron weight, it is also possible to use two phase shifters to separately encode the phase of the neuron input and the phase of the neuron weight. In any case, by using one or more phase shifters to encode signs of the neuron inputs and weights, the field amplitudes of the modulated optical carrier signals can effectively be added or subtracted from each other by interference in the optical combiner 208, resulting in an overall positive or overall negative field. With an even split of the incoming light 212 between N input branches 214 (and assuming there is no bias branch 216), and denoting the field of the incoming carrier light 212 by $E_{in}$, the electrical field amplitude $E_{out}$ of the optical interference signal at the output of the optical combiner 208 is given by:

$$E_{out} = \frac{E_{in}}{N} \sum_{i=1}^{N} w_i x_i e^{j\varphi_i}.$$

The sign information encoded in the phase of an optical signal such as $E_{out}$ is, of course, lost when the intensity of the signal is measured. Therefore, to facilitate distinguishing between an overall positive and an overall negative coherent sum of the modulated carrier signals received from the input branches 214, that coherent sum is offset, in some embodiments, by a bias signal added via the bias branch 216. The bias branch 216 may include an amplitude modulator 226 and an optional phase shifter 228, controlled by the electronic driver circuitry 224, to impart a bias weight $w_b$ and phase shift $\varphi_b$, respectively, on the electric field of the bias signal. Like the phase shifters 222 in the input branches 214, the phase shifter 228 in the bias branch 214 may set the phase shift $\varphi_b$ to π for a negative bias and to zero for a positive bias relative to the optical carrier signals associated with the neuron inputs. (Note that the phase shifter 228 is not needed if the phase of the bias signal is used as the common reference phase relative to which the phase shifts $\varphi_i$ in the input branches 214 are set.) The amplitude modulator 226 may be operated to generate an offset field large enough in amplitude to exceed the maximum expected absolute value of the coherent sum of the modulated optical carrier signals output by the input branches 214 to ensure that the overall interference signal has a positive field amplitude. With a 1:1 split of the incoming light 212 between the input branches 214 and the bias branch 216 and an even split between N input branches 214, the electrical field amplitude $E_{out}$ of the optical interference signal at the output of the optical combiner 208 is given by:

$$E_{out} = \frac{1}{2}E_{in}\left[w_b e^{j\varphi_b} + \frac{1}{N}\sum_{i=1}^{N} w_i x_i e^{j\varphi_i}\right].$$

As can be seen, if the bias term and the neuron-input term are phase-aligned and the weights $w_i$ and inputs $x_i$ are all no greater than 1 (as is the case if the amplitude modulators all attenuate the signal or just operate transparently rather than amplifying it), a bias weight $w_b$ equal to 1—trivially implemented by a bias branch 216 without an amplitude modulator 226—would ensure that the bias term exceeds the absolute value of the neuron-input term; accordingly, in some embodiments, the bias branch 216 can be an additional interferometer arm receiving half of the input light 212, without anything further.

As shown in FIG. 2, the optical interference signal that is output by the coherent linear neuron stage 202 may be provided to the non-linear activation and conversion unit 204, which applies an activation function and generates an electronic neuron output signal 230. In some embodiments, an optical non-linear activation unit 232 implements an activation function all-optically in that it produces an optical neuron output signal encoding the output value of the activation function; an example optical non-linear activation unit 232 is depicted in FIG. 7. The optical neuron output signal 234 can then be converted, e.g., by measurement of the intensity with a photodetector 236, into the electronic neuron output signal 230. Alternatively, the photodetector 236 itself may serve to implement the non-linear activation function, opto-electronically converting the amplitude $|E_{out}|$ of the optical interference signal into an electronic signal proportional to the square of the amplitude. The non-linear activation and conversion unit 204 may also include circuitry (not shown) following the photodetector 236 that applies an activation function electronically after conversion of the optical linear-neuron output 114 into the electrical domain. Thus, in general, the electro-optic nonlinearity inherently applied by the photodetector 236 may by itself constitute the non-linear activation, or may be combined with a preceding all-optical or an electronic nonlinearity to implement an overall non-linear activation function.

In various embodiments, the optical neuron 200 is implemented in photonic integrated circuitry, with the benefits of a small form factor, which allows for controllability and high complexity of the circuits, and the ability to use existing semiconductor foundries for manufacture, which translates into high-volume manufacturing and low cost. However, implementations using fiber optics and bulk optical components, alone or in combination with one or more photonic integrated circuits, are also possible in principle. The optical splitter 206 and the optical combiner 208 (which is, in essence, a splitter operated in reverse), may be, for example, fiber-optic fused biconical taper (FBT) splitters, or planar lightwave circuit (PLC) splitters, binary-tree splitters based on multimode interferometers or directional couplers, or thermally reconfigurable binary-tree splitters based on Mach-Zehnder interferometers or star couplers. A PLC splitter is generally formed by a cascade of waveguide-based power splitters each including a Y-junction that divides an input evenly into two outputs, illustrated in the example coherent linear neuron of FIG. 5. Integrated waveguides coupled to the optical splitter 206 and optical combiner 208 at their inputs and outputs, respectively, may serve as the interferometer branches 214, 216. The phase shifters 222, 228 may include electro-optic and/or thermal phase shifters that modulate the refractive index within interferometer branches 214, 216 (e.g., waveguides) by application of an electrical voltage or heat, respectively. In the case of a thermal phase shifter, heat is usually applied by one or more Ohmic heating filaments; thus, thermal phase shifters, like electro-optic phase shifters, can be controlled via electronic signals. The amplitude modulators 218, 220, 226 may likewise be implemented by electro-optic or thermo-optic components. For example, MZIs with electronically controlled electro-optic or thermal phase shifters in the interferometer arms may be used to modulate, via the relative phase of the interfering signals at the MZI output, the amplitude of the optical carrier signal. Alternatively, electro-absorption modulators (EAMs), optical resonant modulators (e.g. optical ring modulators), multi-quantum well (e.g. STARK) modulators or other types of optical modulators may serve to modulate the amplitude of the optical carrier signals in the interferometer branches 214, 216. The optical non-linear activation unit 232 may be implemented with a photonic circuit using, e.g., optical interferometers, attenuators, amplifiers, etc., such as illustrated for one example unit in FIG. 7A.

Figure 3:
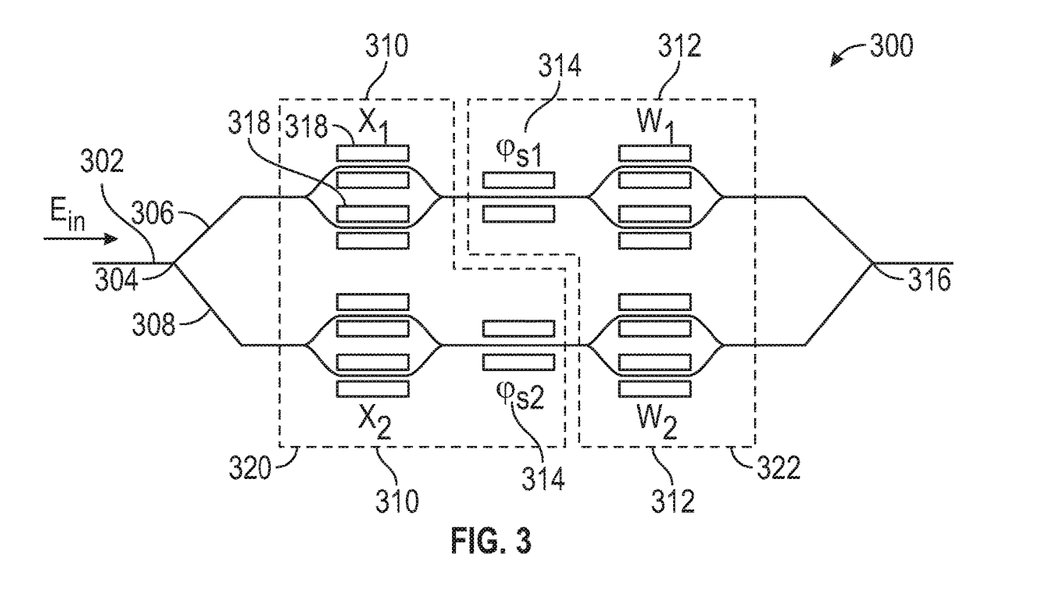
FIG. 3 is a schematic diagram of an example dual-input coherent linear neuron employing MZIs, in accordance with one embodiment.

Turning now to various concrete implementations of the coherent linear neuron stage 202, FIG. 3 is a schematic diagram of an example dual-input coherent linear neuron 300 that employs Mach-Zehnder interferometers, in accordance with one embodiment. In this example, the incoming light in input waveguide 302 is split passively at a first Y-junction 304, corresponding to the optical splitter 206, between two interferometer branches 306, 308, each associated with one of two neuron inputs $x_i$. Each of the branches 306, 308 includes two MZIs 310, 312 and a phase shifter 314. A second Y-junction 316, corresponding to the optical combiner 208, passively recombines the modulated light at the outputs of the interferometer branches 306, 308 to generate an interference signal.

As indicated in the figure, the MZIs 310, 312 may be operated in push-pull configuration, where equal but opposite phase shifts $\pm\Delta\phi/2$ (generally differing between the different MZIs 310, 312) are applied to the two interferometer arms of the respective MZI 310, 312 by phase shifters 318 (indicated only in MZI 310 of branch 306), such that the light interferes at the output of the MZI 310, 312 with a total relative phase shift $\Delta\phi$, causing an amplitude modulation of the optical signal exiting the MZI 310, 312 by a factor of cos $\Delta\phi/2$. With a characteristic modulator voltage $V_\pi$ for obtaining a $\pi$ phase shift, the phase shifts $\Delta\phi_{xi}$ in the MZIs 310 associated with the neuron inputs $x_i$ and the phase shifts $\Delta\phi_{wi}$ in the MZIs 312 associated with the neuron weights $w_i$ depend on the voltages $V_{xi}$ and $V_{wi}$ applied at the MZIs 310 and 312, respectively, according to $\Delta\phi_{xi}=\pi V_{xi}/V_\pi$ and $\Delta\phi_{wi}=\pi V_{wi}/V_\pi$ (i=1,2). The voltages $V_{xi}$ and $V_{wi}$ are set to impart the neuron weights $$x_i = \cos\frac{\pi V_{xi}}{2V_\pi} \text{ and } w_i = \cos\frac{\pi V_{wi}}{2V_\pi}$$

on the optical carrier signals in the interferometer branches 306, 308. The phase shifters 314 are operated to cause phase shifts $\varphi_i$ for a relative phase shift $|\varphi_2-\varphi_1|$ of zero or $\pi$ to cause constructive or destructive interference of the optical carrier signals of branches 306, 308, respectively. The interference signal can be expressed in terms of the various shifts imparted by phase shifters $$E_{out} = \frac{1}{2}E_{in}\left[\cos\frac{\Delta\phi_{x1}}{2}\cos\frac{\Delta\phi_{w1}}{2}e^{j\varphi_1} + \cos\frac{\Delta\phi_{x2}}{2}\cos\frac{\Delta\phi_{w2}}{2}e^{j\varphi_2}\right].$$

The dual-input coherent linear neuron 300 can be constructed from a pair of IQ modulator devices 320, 322 (indicated by dotted lines), each including an amplitude modulator and a phase shifter in parallel with another amplitude modulator, the two IQ modulators being connected to provide the two interferometer branches 306, 308 with two amplitude modulators and a phase shifter in each. IQ modulators are off-the-shelf components typically used to generate quadrature signals by operating the two phase shifters 314 at a relative phase difference of $\pi/2$. However, when used to implement an optical neuron that allows two weighted neuron inputs to be selectively added or subtracted, the phase shifters are instead operated to create a relative phase shift of zero or $\pi$, as described above. Beneficially, the ready availability of IQ modulators provides for a convenient way to implement dual-input optical neurons (e.g., dual-input coherent linear neuron 300), and enables the use of well-established techniques in optical communications for time alignment and amplitude-accurate signal generation. Of course, construction from IQ modulators is optional, and the coherent linear neuron 300 can also be straightforwardly implemented with individual amplitude modulators (e.g., MZIs 310, 312) and phase shifters 314.

Figure 4:
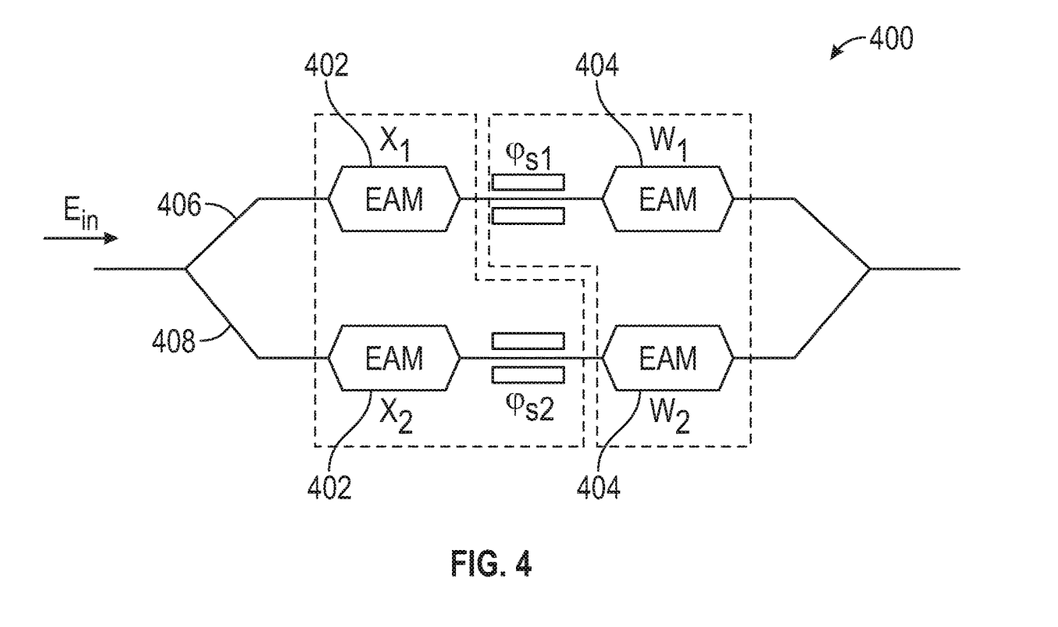
FIG. 4 is a schematic diagram of an example dual-input coherent linear neuron employing electro-absorption modulators (EAMs), in accordance with one embodiment.

FIG. 4 is a schematic diagram of an example dual-input coherent linear neuron 400 employing electro-absorption modulators (EAMs), in accordance with one embodiment. Apart from employing EAMs 402 instead of MZIs to modulate the amplitude of optical carrier signals in the two interferometer branches 406, 408 to impart the neuron inputs $x_i$ and neuron weights $w_i$, this coherent linear neuron 400 is similar to the coherent linear neuron 300 depicted in FIG. 3. EAMs generally operate based on the Franz-Keldysh effect, which is a change in the absorption spectrum of a semiconductor via a change in the bandgap energy as caused by an applied electric field. They can be implemented as integrated photonic structures, e.g., as vertical diode mesas, and may include quantum well structures in the intrinsic layer of the diode mesa to exploit the quantum-confined Stark effect for high extinction ratios. EAMs offer small size and low modulation voltages (on the order of one to a few volts), which renders them beneficial for use in optical neural networks, where amplitude modulators may be used in large numbers.

Figure 5:
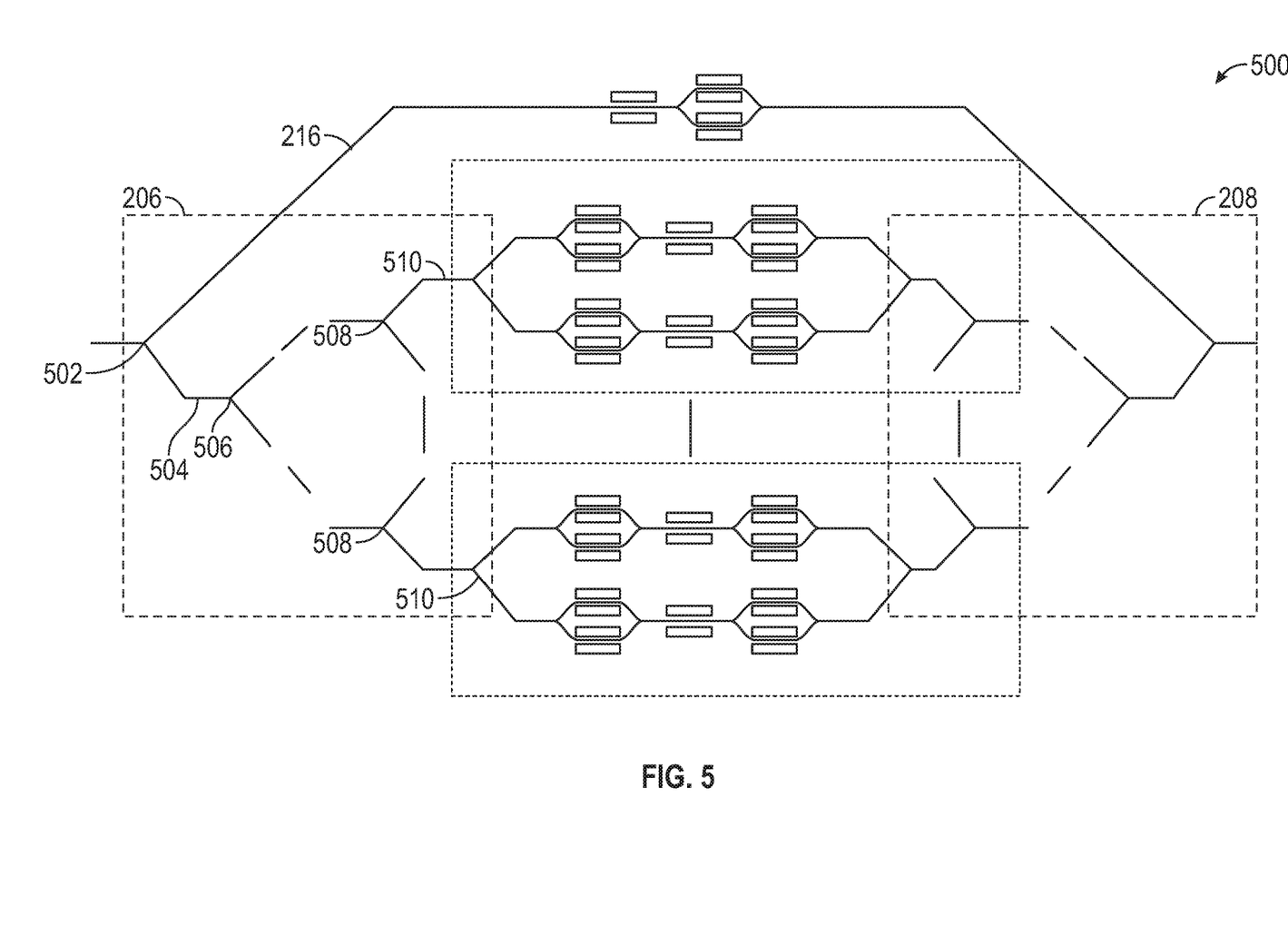
FIG. 5 is a schematic diagram of an example biased multi-input coherent linear neuron in accordance with one embodiment.

FIG. 5 is a schematic diagram of an example biased multi-input linear optical neuron 500, in accordance with one embodiment. The optical splitter 206 and combiner 208 are implemented, in this case, by cascaded Y-junctions, where each Y junction evenly splits the input power between the two output branches of the junction. At the first, highest-level junction 502, the optical carrier signal is split between the bias branch 216 and an (overall) input branch 504. At m subsequent levels of Y-junctions 506, 508, 510, the optical carrier signal in the input branch 504 is successively split into a total of $2^m$ individual input branches, allowing for a $2^m$-fold fan-in of the optically implemented linear neuron. In the optical combiner 208, a reverse, mirrored cascade of Y-junctions recombines all the signals. Note that the number of neuron inputs need not be a power of 2. If fewer than $2^m$ input signals are needed, some of the Y-junctions may simply drop one of the output signals.

Figure 6A:
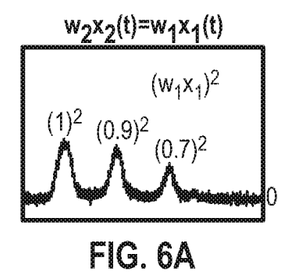
FIGS. 6A-6T are graphs of output signal intensities of a dual-input coherent linear neuron for various combinations of two input signals, in accordance with an example embodiment.
Figure 6B:
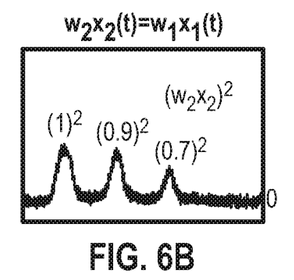
Figure 6C:
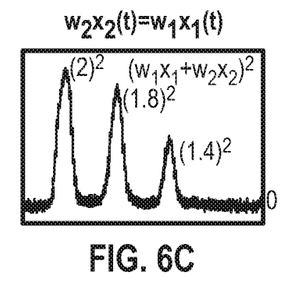
Figure 6D:
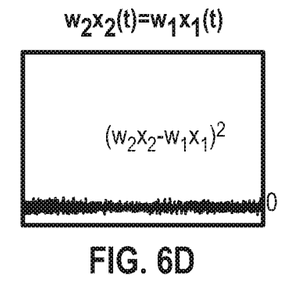
Figure 6E:
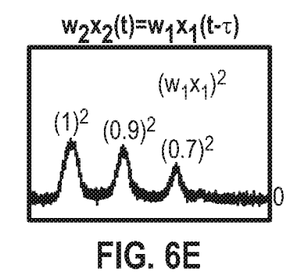
Figure 6F:
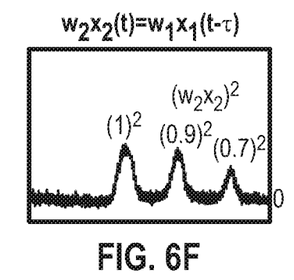
Figure 6G:
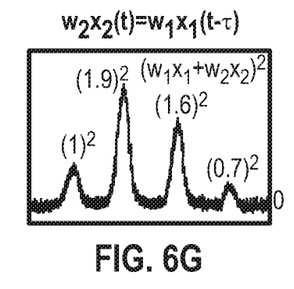
Figure 6H:
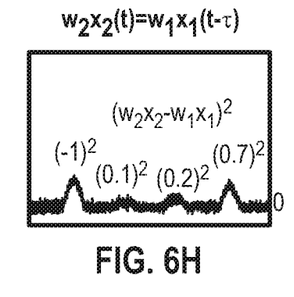
Figure 6I:
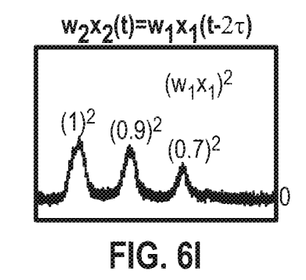
Figure 6J:
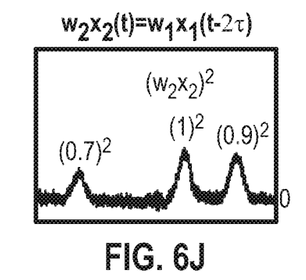
Figure 6K:
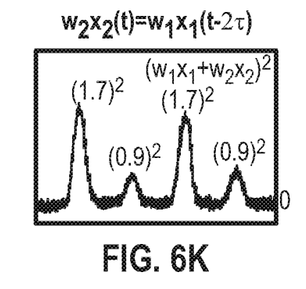
Figure 6L:
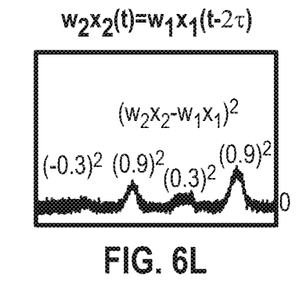
Figure 6M:
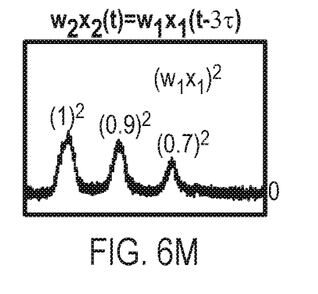
Figure 6N:
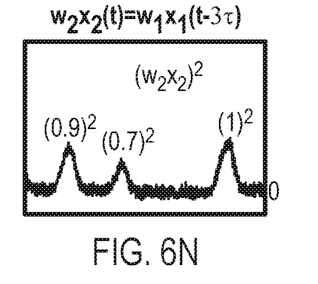
Figure 6O:
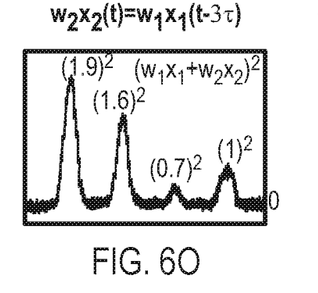
Figure 6P:
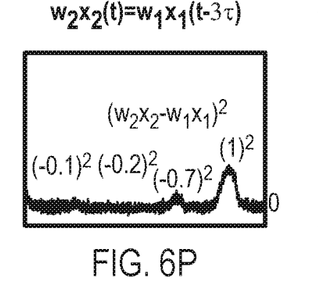
Figure 6Q:
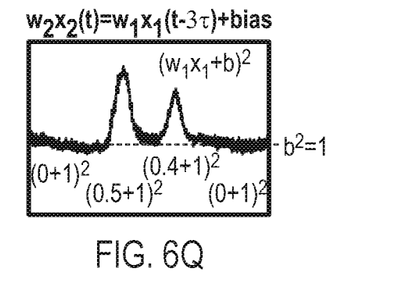
Figure 6R:
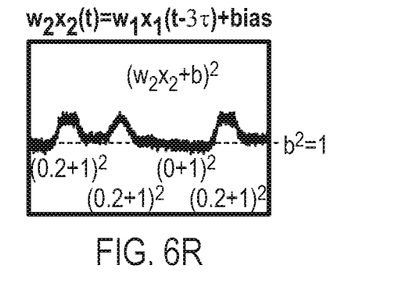
Figure 6S:
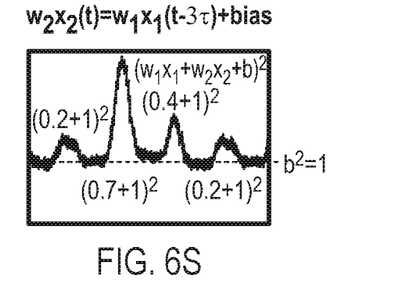
Figure 6T:
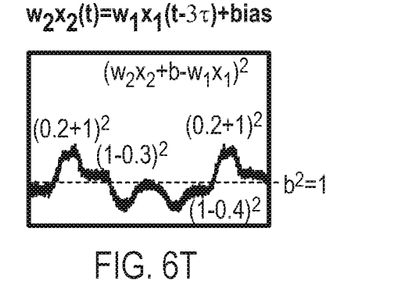

Turning now to FIGS. 6A-6T, the practical feasibility of adding two weighted input signals using a dual-input coherent linear neuron (e.g., as depicted in FIG. 3) in conjunction with a bias branch (e.g., as shown in FIG. 5) is illustrated. FIGS. 6A-6T are graphs of output signal intensities of the dual-input coherent linear neuron for various combinations of two input signals, in accordance with an example embodiment. The extension to a weighted sum of more than two input signals will be readily apparent to those of ordinary skill in the art. The graphs show pulse traces as measured by the electrical output of a photodetector, which measures the equivalent optical power, or intensity, of the respective optical pulse. The weighted sum of the neuron inputs, which is represented by the electrical field amplitude of the output optical signal, can be determined by taking the square root of the measured optical intensity.

Each column in FIGS. 6A-6T (e.g., columns 6A-6D, columns 6E-6H, etc.) illustrates a different set of two weighted input signals $w_1x_1$ and $w_2x_2$, corresponding to the optical powers $(w_1x_1)^2$ and $(w_2x_2)^2$ (as measured at the outputs of the individual respective input branches 306, 308) shown in the first and second row, respectively, and the sum and difference of the weighted signals, corresponding to the optical powers $(w_1x_1+w_2x_2)^2$ and $(w_1x_1-w_2x_2)^2$ (as measured at the output of the Y-junction 316) shown in the third and fourth row, respectively. The pulse trace for each input signal includes a sequence of three pulses of decreasing amplitude, and the various columns in FIGS. 6A-6T differ in the time delay between the two pulse traces to provide different numerical combinations of the amplitudes.

More specifically, FIGS. 6A and 6B depict traces of two identical input signals $(w_1x_1)^2$ and $(w_2x_2)^2$. Normalizing each of the two pulse sequences to its highest peak power, the two sequences reveal electric field peak amplitudes of 1, 0:9, and 0:7 for their respective three constituent pulses. Inducing a 0 or $\pi$ phase shift by means of a phase shifter, coherent addition or subtraction between the two input signals is achieved, resulting in $(w_1x_1+w_2x_2)^2$ and $(w_1x_1-w_2x_2)^2$ at the output of the photodetector. Normalizing again with respect to the highest input pulse peak power, FIG. 6C confirms the successful coherent addition of the input signals, as the ratio between the intensities of the output pulse peak powers $(w_1x_1+w_2x_2)^2$ is identical to the respective ratios of the constituent pulse peak powers $(w_1x_1)^2$ and $(w_2x_2)^2$. FIG. 6D shows clearly the successful result of the squared difference of the input signals, $(w_1x_1-w_2x_2)^2$, which equals zero in this case.

FIGS. 6E-6H depict the case where, for two otherwise identical pulse sequences, the sequence for $(w_2x_2)^2$, shown in FIG. 6F, is delayed by one pulse period with respect to the pulse sequence for $(w_1x_1)^2$, shown in FIG. 6E. Again, successful coherent addition and subtraction are demonstrated by the respective pulse traces for $(w_1x_1+w_2x_2)^2$ and $(w_1x_1-w_2x_2)^2$, which are shown in FIGS. 6G and 6H, respectively. The third column (FIGS. 6I-6L) and the fourth column (FIGS. 6M-6P) illustrate two additional scenarios, where the pulse sequence for $(w_2x_2)^2$ is delayed with respect to the pulse sequence for $(w_1x_1)^2$ by two and three pulse periods, respectively. FIGS. 2K-2L and FIGS. 2O-2P verify successful addition and subtraction for both cases.

It is noted that the results depicted in FIGS. 6C, 6G, 6K, 6O, and 6S have been obtained with a different normalization factor than for FIGS. 6B, 6F, 6J, 6N, and 6R, resulting from the application of different attenuations for the different traces prior to monitoring the photodetector output, which serves to ensure that their optical power levels are within the operational range of the photodetector. The distorted pulses that can be seen in FIGS. 6L, 6R, and 6T result from the sinusoidal transfer function of Mach-Zehnder modulators used in the amplitude modulation, which causes flat-top pulses with spikes on their rising and falling edges that stem from the subtraction of optical pulses with slight differences in their pulse shape.

Without an added bias branch, the coherent linear neuron can only provide the absolute value of the difference between two input signals, as can be seen in FIGS. 6L and 6P; the sign of the difference stays concealed in the phase of the optical carrier signal. To reveal the sign of the difference in the optical power domain, one of the weighted input signals may be superimposed onto a DC biasing power level, denoted as b in FIGS. 6Q-6T. FIGS. 6Q and 6R show the intensity of the individual bias-shifted signals, $(w_i x_i + b)^2$. With the bias b applied to the second signal $w_2 x_2$, the sum and differences of the signals result in intensities of $(w_1 x_1 + w_2 x_2 + b)^2$ and $(w_2 x_2 + b - w_1 x_1)^2$, shown in FIGS. 6S and 6T. Normalizing the pulse sequence to the power level of the DC biasing signal, the successful coherent addition is confirmed in FIG. 6S, where all pulses appear atop the bias level (indicated by a dashed horizontal line). The coherent subtraction is illustrated in FIG. 6T, which shows that, indeed, the positive differences are imprinted as pulses atop the bias level, but the negative differences emerge as inverted pulses below the bias level.

Figure 7A:
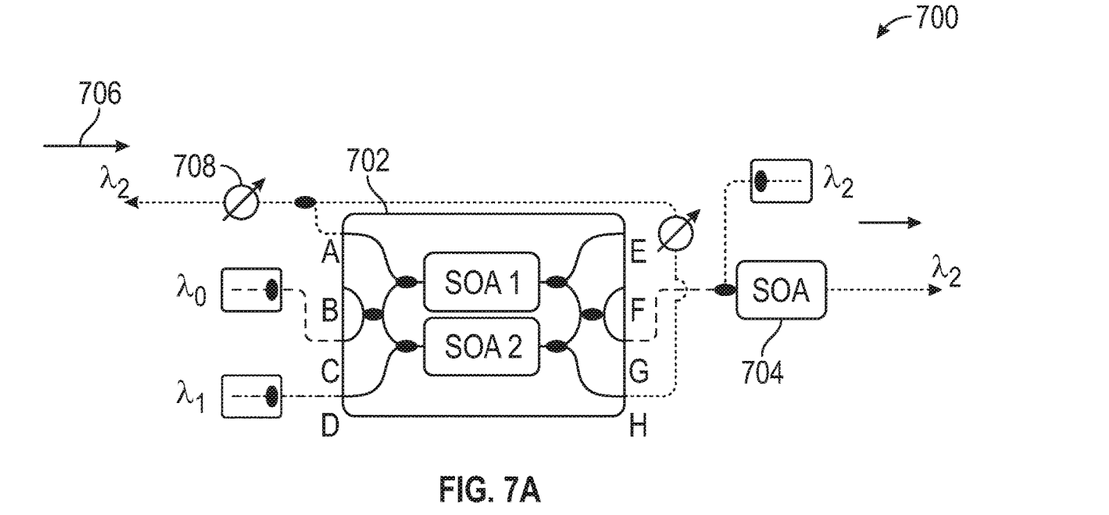
FIG. 7A is a schematic diagram of an example all-optical non-linear activation unit in accordance with one embodiment.

The coherent sum of the input signal as output by the coherent linear neuron can flow into a subsequent non-linear activation stage, which, as indicated above, may be implemented all-optically, electro-optically or electronically in the electronic control circuitry. FIG. 7A is a schematic diagram of an example all-optical non-linear activation unit 700 in accordance with one embodiment. The activation unit 700 includes a semiconductor optical amplifier Mach-Zehnder interferometer (SOA-MZI) 702 operating in its deeply saturated regime and configured in a differentially biased scheme, followed by an SOA 704 that operates in its small-signal gain region, with both devices performing as wavelength converters. One continuous-wave (CW) optical input at wavelength $\lambda_0$ is driven to the input C of both SOA1 and SOA2 of SOA-MZI 702, with another CW optical input at $\lambda_1$ being fed only into SOA2 through the control arm D in order to realize the differentially-biased scheme, with both CW signals having high optical power levels and forcing both SOA1 and SOA2 to operate in their deeply saturated regime. The coherent linear neuron output is provided as an input signal 706 to the SOA-MZI 702 to serve as an additional control pulse signal at $\lambda_2$, which is attenuated by a bias attenuator 708 in order to achieve the proper biasing of the activation function, and is then split into two identical streams before being forwarded into the ports A and H of the SOA-MZI branches as co- and counter-propagating control beams. In this way, an inverse copy of the control signal imprinted on $\lambda_0$ is obtained at the switched output port G of the differentially-biased SOA-MZI 702. The inverse copy of the imprinted control signal is subsequently injected as control into the SOA 704, which operates as a cross-gain modulation wavelength converter (XGM-WC) and restores both the wavelength and the logic of the input signal 706 using an additional CW optical input at $\lambda_2$.

Figure 7B:
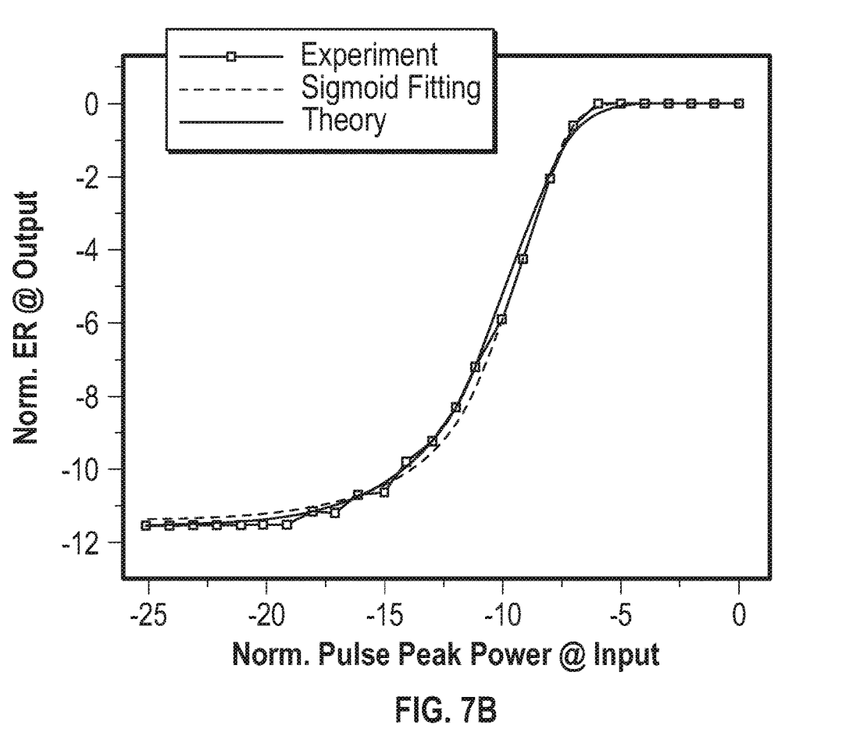
FIG. 7B is a graph of the activation function implemented by the non-linear activation unit shown in FIG. 7A.

FIG. 7B is a graph illustrating the activation function implemented by the non-linear activation unit 700 shown in FIG. 7A. As can be seen by the fit, the functional shape closely approximates a sigmoid. This sigmoid transfer function of the optical activation unit 700 stems from the power equalization properties of the deeply saturated differentially-biased SOA-MZI 702 along with the nonlinear transfer function of the XGM-WC operation of the SOA 704. The injection of the appropriate amount of the $\lambda_1$ CW light at SOA2 of the SOA-MZI 702 leads the SOA2 gain close to its unitary end-point at the transparency region. At the same time, the CW input signal at $\lambda_0$ forces SOA1 to operate at a different gain level slightly above the transparency region, so that the differential gain between the two SOAs corresponds to a $\pi$ phase-shift between the two SOA-MZI branches. Using this biasing scheme, the injection of a control pulse sequence with intense pulse peak power variation will result in the inverted copy of this signal at the SOA-MZI output, but with almost power-equalized pulses.

An optical neuron 200 in accordance with this disclosure generally includes a coherent linear neuron stage 202 (e.g., any of the coherent linear neurons 300, 400, 500 shown in FIGS. 3-5), followed by a non-linear activation and conversion unit (204). The coherent linear neuron stage 202 imparts electronic neuron input signals onto the field amplitudes of optical carrier signals and coherently generates an optical signal representing the weighted sum of the input signals, that applies a non-linear activation function to the optical output of the coherent linear neuron stage (e.g., using an optical activation unit such as, without limitation, the sigmoid activation unit 700 shown in FIG. 7A) and converts the optical output signal into an electronic output signal 230. By feeding the electronic output signal 230 of one optical neuron as a neuron input signal to the electronic driver circuitry associated with another optical neuron, multiple optical neurons can be connected to form an optical neural network.

Figure 8:
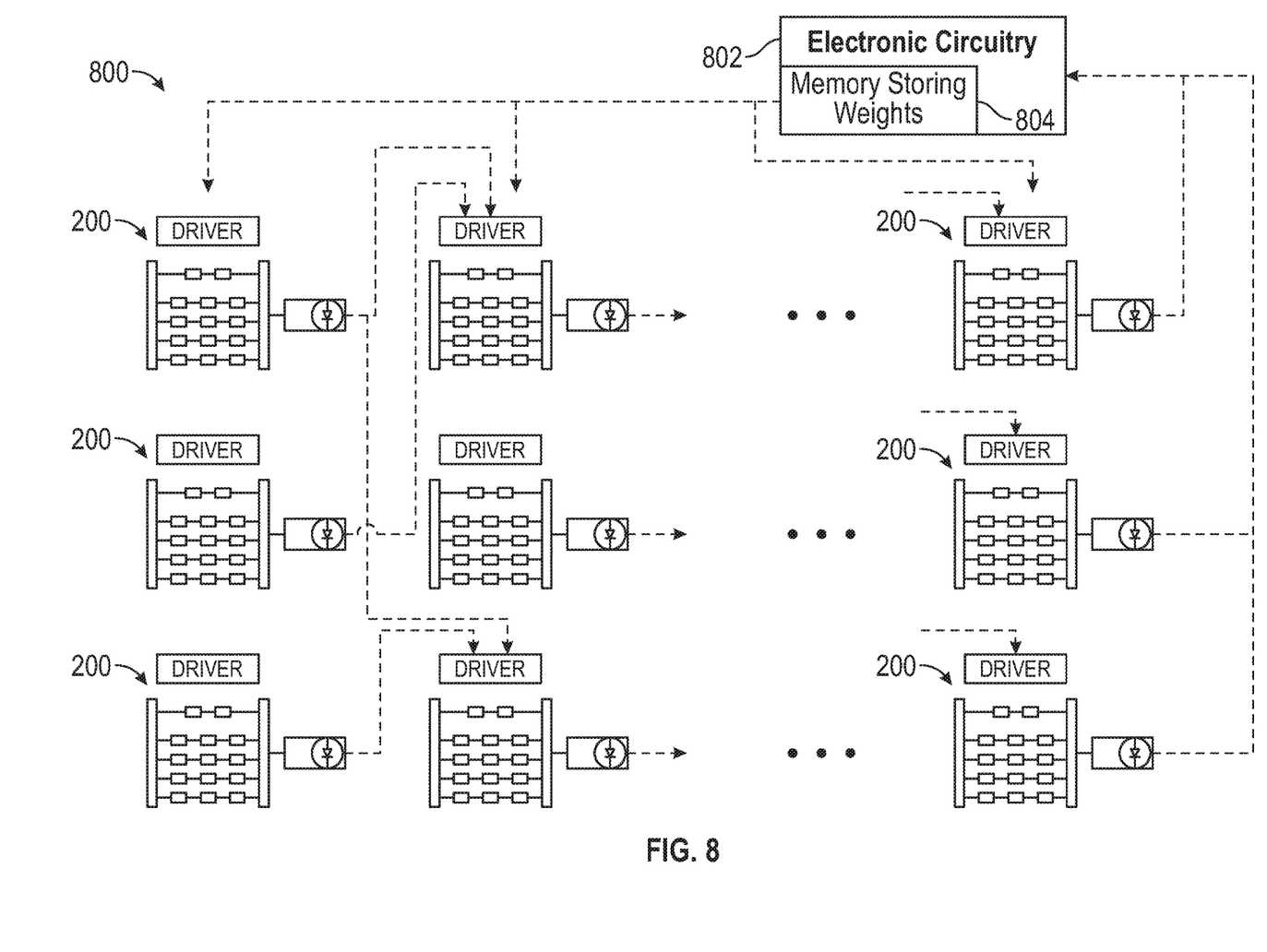
FIG. 8 is a schematic diagram of an example optical neural network employing optical neurons as shown in FIG. 2, in accordance with various embodiments.

FIG. 8 is a schematic diagram illustrating an example optical neural network 800 employing optical neurons 200 as shown in FIG. 2, in accordance with various embodiments. The depicted neural network 800 includes multiple layers of neurons 200, with electronic output signals of one layer being used to determine the neuron inputs to the next layer (specifically, the electronic driver circuitry associated with the next layer). The first layer may receive neuron inputs from external sources, and the last layer provides the outputs of the neural network 800, which may flow into downstream computations performed by analog and/or digital electronic circuitry 802, such as an application-specific integrated circuit (ASIC), digital signal processor (DSP), or other special-purpose processor, or a general-purpose computer processor executing suitable software instructions. In some embodiments, the electronic circuitry 802 is integrated, in whole or in part, with a PIC containing the optical neural network 800 in a system-on-chip or chip-scale package; and in some embodiments, the electronic circuitry 802, or part thereof, may even be monolithically integrated with the optical neural network 800.

The neural network 800 may be trained to determine the neuron weights applied by the electronic driver circuitry associated with the optical neurons 200. For example, a supervised learning process may be employed to determine the weights based on training data that includes sets of neural-network inputs paired with respective sets of "ground-truth" neural-network outputs (or "labels"). Such a training process generally involves computing, in a forward propagation phase, the neural-network outputs for a given set of neural-network inputs, and then comparing the neural-network outputs against the ground-truth outputs and adjusting the neural-network weights, in a back-propagation phase, based on the discrepancy. In some embodiments, the optical neural network 800 itself is used in the forward propagation phase to optically determine the neural-network outputs, and the backpropagation phase is implemented electronically, e.g., using part of the electronic circuitry 802 (e.g., a dedicated training circuit, or a general-purpose processor executing a training program). The electronically computed weight adjustments can then be communicated to the electronic driver circuitry. Alternatively, the neural network may be trained entirely electronically, with both forward and backpropagation phase being performed by an electronic processor, separately from the optical neural network 800, and once the network weights are optimized, they are simply applied to the optical neural network 800 via the electronic driver circuitry. Either way, the weights may be stored in memory 804 integrated with the optical neural network, e.g., as part of the electronic circuitry 802.

Figure 9:
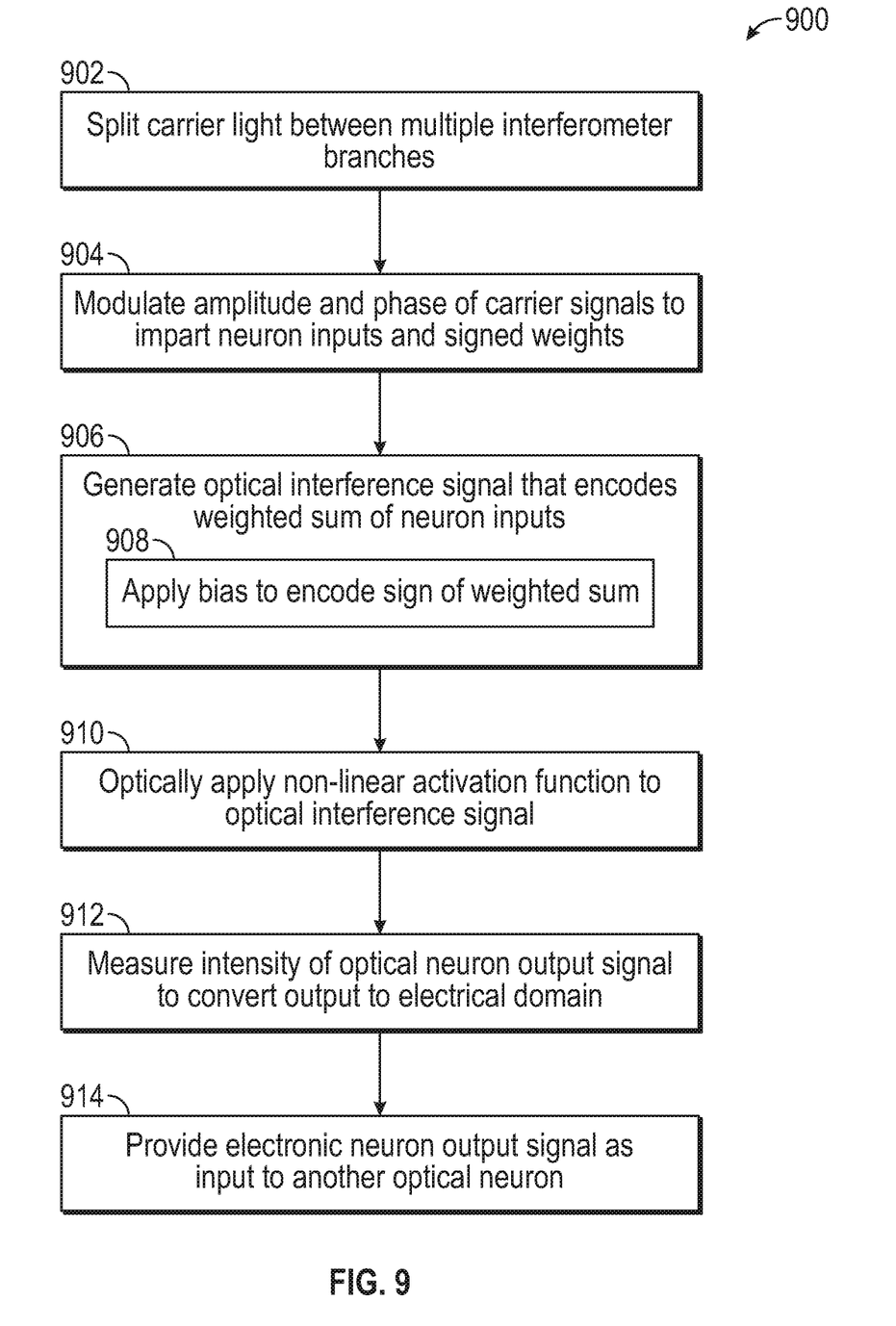
FIG. 9 is a flow chart of an example neuromorphic computing method employing optical neurons in accordance with various embodiments.

FIG. 9 is a flow chart of a neuromorphic computing method 900 employing optical neurons (e.g., as depicted in FIG. 2) and optical neural networks (e.g., as depicted in FIG. 8). In accordance with the method 900, carrier light is split, in act 902, between multiple optical interferometer branches of a multipath optical interferometer that implements the linear neuron stage of an individual optical neuron and has different neuron inputs associated with different ones of the interferometer branches. In act 904, the field amplitudes and phases of the optical carrier signals in the optical interferometer branches are modulated, e.g., electrooptically or thermo-optically, to impart the associated neuron inputs and, separately from the neuron inputs, neuron weights onto the optical carrier signals. More specifically, in various embodiments, the absolute values of the neuron inputs are imparted onto the field amplitudes of the optical carrier signals by a first set of amplitude modulators (one amplitude modulator in each branch), the absolute values of the neuron weights are imparted onto the field amplitude using a second set of amplitude modulators, and the signs of the neuron inputs and neuron weights are imparted on the phase of the optical carrier signal using one or more phase shifters. At the outputs of the interferometer branches, the modulated optical carrier signals are then recombined, in act 906, to generate an optical interference signal that is indicative of the weighted sum of the neuron inputs. In some embodiments, the optical interference signal may be biased, e.g., by interference of the modulated carrier signals encoding the neuron inputs and weights with an additional bias signal (which may be modulated in amplitude and/or phase accordance with a bias amplitude and sign), to encode not only the absolute value, but also the sign of the weighted sum of the neuron inputs in the intensity of the optical interference signal (as illustrated with the example pulse sequences of FIGS. 6A-6T (act 908).

Further, in some embodiments, a non-linear activation function is optically applied to the optical interference signal to generate the optical neuron output signal in act 910, and the intensity of the optical neuron output signal is measured in act 912, e.g., by a photodetector, to determine an electronic neuron output. Alternatively, the intensity of the optical interference signal may be measured directly to determine the electronic neuron output in act 912; in this case, the non-linear response of the photodetector inherently implements the non-linear activation function simultaneously with converting the neuron output from the optical to the electrical domain. In yet another embodiment, an electronic non-linear activation is applied after conversion of the optical neuron output into the electrical domain via measurement of the intensity. In any case, based on the resulting electronic neuron output signal, the neuron input to another neuron may be determined in act 914.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. An optical neuron to optically process a plurality of neuron inputs, the optical neuron comprising:
   a multipath optical interferometer comprising:
      an optical splitter;
      a plurality of parallel optical interferometer branches coupled to the optical splitter, the optical splitter configured to operatively split light between the parallel optical interferometer branches into a plurality of optical carrier signals, the plurality of parallel optical interferometer branches comprising multiple input branches each associated with one of the neuron inputs and each comprising a first amplitude modulator, a second amplitude modulator, and at least one phase shifter; and
      an optical combiner coupled to outputs of the plurality of parallel optical interferometer branches and configured to operatively cause interference between modulated optical carrier signals received from the plurality of parallel optical interferometer branches to generate an optical interference signal; and
   electronic driver circuitry configured to operatively control the first amplitude modulators, the second amplitude modulators, and the phase shifters to:
      cause the first amplitude modulators to impart the neuron inputs onto field amplitudes of the optical carrier signals in the associated input branches,
      cause the second amplitude modulators to impart neuron weights onto the field amplitudes of the optical carrier signals in the associated input branches, and
      cause the phase shifters to selectively induce zero or π phase shifts in the optical carrier signals in the associated input branches to thereby impart signs of the neuron weights and neuron inputs onto the optical carrier signals in the associated input branches,
   wherein the optical interference signal is indicative of a weighted sum of the neuron inputs.

2. The optical neuron of claim 1, wherein the plurality of parallel optical interferometer branches further comprises a bias branch comprising an amplitude modulator to impart a weighted bias onto a field amplitude of the optical carrier signal in the bias branch, the weighted bias operatively set to cause a field amplitude of the optical carrier signal in the bias branch to exceed a maximum expected absolute value of a negative coherent sum of the field amplitudes of the modulated optical carrier signals output by the input branches.

3. The optical neuron of claim 1, further comprising:
   a non-linear activation and conversion unit coupled to an output of the optical combiner and comprising a photodetector to generate an electronic neuron output signal from the optical interference signal.

4. The optical neuron of claim 3, wherein the non-linear activation and conversion unit comprises an all-optical activation unit preceding the photodetector.

5. The optical neuron of claim 3, wherein the non-linear activation and conversion unit comprises an electronic activation unit following the photodetector.

6. The optical neuron of claim 1, wherein the first and second amplitude modulators comprise at least one of a Mach-Zehnder modulator, an electro-absorption modulator, or an optical resonant modulator.

7. The optical neuron of claim 1, wherein the phase shifters comprise at least one of a thermal phase shifter or an electro-optic phase shifter.

8. The optical neuron of claim 1, wherein the multipath interferometer is implemented as part of an integrated photonic circuit.

9. An optical neural network comprising:
a plurality of optical neurons each comprising:
  a multipath interferometer comprising a plurality of parallel optical interferometer branches coupled between an optical splitter and an optical combiner, the optical interferometer branches comprising a plurality of input branches associated with neuron inputs and each comprising a first amplitude modulator, a second amplitude modulator, and at least one phase shifter, the optical combiner configured to operatively generate an optical interference signal from modulated optical carrier signals output by the plurality of optical interferometer branches;
  electronic driver circuitry configured to operatively control the first and second amplitude modulators and the phase shifters in the input branches to impart the signed neuron inputs and signed neuron weights onto optical carrier signals in the respective input branches to generate the modulated optical carrier signals output by the input branches; and
  a non-linear activation and conversion unit, coupled to an output of the optical combiner and comprising a photodetector, to generate an electronic neuron output signal; and
electronic control circuitry configured to determine, from the electronic neuron output signal of at least one of the plurality of optical neurons, a neuron input to another one of the plurality of optical neurons.

10. The optical neural network of claim 9, wherein the electronic driver circuitry of each of the optical neurons is configured to operatively:
  cause the first amplitude modulators to impart the neuron inputs onto field amplitudes of the optical carrier signals in the associated input branches,
  cause the second amplitude modulators to impart values of the signed neuron weights onto the field amplitudes of the optical carrier signals in the associated input branches, and
  cause the phase shifters to selectively induce zero or 7C phase shifts in the optical carrier signals in the associated input branches to thereby impart signs of the signed neuron weights and the signed neuron inputs onto the optical carrier signals in the input branches.

11. The optical neural network of claim 9, wherein, for each of the optical neurons, the optical interferometer branches further comprise a bias branch comprising an amplitude modulator to operatively impart a weighted bias onto an optical carrier signal in the bias branch to generate the modulated optical carrier signal output by the bias branch, the weighted bias operatively set to cause a field amplitude of the modulated optical carrier signal in the bias branch to exceed a maximum expected absolute value of a negative coherent sum of field amplitudes of the modulated optical carrier signals output by the input branches.

12. The optical neural network of claim 9, wherein at least one of the non-linear activation and conversion units of the plurality of optical neurons comprises an all-optical activation unit generating an optical neuron output signal preceding the photodetector.

13. The optical neural network of claim 9, wherein the optical neurons are implemented with integrated photonic circuitry on a single substrate.

14. The optical neural network of claim 13, wherein the electronic control circuitry is implemented as an integrated circuitry packaged with the integrated photonic circuitry in a system-on-chip or chip-scale package.

15. An optical neuromorphic computing method employing an optical neuron comprising a multipath optical interferometer, the method comprising:
  splitting light between multiple optical interferometer branches of the multipath optical interferometer into multiple respective optical carrier signals, each of the multiple optical interferometer branches having an associated neuron input and an associated neuron weight;
  modulating field amplitudes and phases of the optical carrier signals in the optical interferometer branches to separately impart the associated neuron inputs and the associated neuron weights onto the optical carrier signals; and
  recombining the optical carrier signals at outputs of the optical interferometer branches to generate an optical interference signal indicative of a weighted sum of the neuron inputs.

16. The optical neuromorphic computing method of claim 15, wherein the field amplitudes of the optical carrier signals are modulated by first amplitude modulators in the optical interferometer branches to impart the associated neuron inputs and by second amplitude modulators in the optical interferometer branches to separately impart the associated neuron weights onto the optical carrier signals, and wherein the phases of the optical carrier signals in the input are selectively shifted by zero or π to thereby impart signs of the associated neuron inputs and neuron weights onto the optical carrier signals.

17. The optical neuromorphic computing method of claim 16, wherein the field amplitudes and phases of the optical carrier signals are modulated at least one of electro-optically or thermo-optically.

18. The optical neuromorphic computing method of claim 15, further comprising:
  measuring an intensity of the optical interference signal or of an optical neuron output signal generated from the optical interference signal, and using the measured intensity to determine a neuron input to another optical neuron.

19. The optical neuromorphic computing method of claim 18, further comprising:
  applying a non-linear optical activation function to the optical interference signal to generate the optical neuron output signal.

20. The optical neuromorphic computing method of claim 15, further comprising:
  biasing the optical interference signal to encode both absolute value and sign of the weighted sum of the neuron inputs in an intensity of the optical interference signal.

* * * * *